US012427773B2

(12) United States Patent
Shinomiya

(10) Patent No.: US 12,427,773 B2
(45) Date of Patent: Sep. 30, 2025

(54) PRINTER

(71) Applicant: Roland DG Corporation, Hamamatsu (JP)

(72) Inventor: Bunji Shinomiya, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 172 days.

(21) Appl. No.: 18/399,059

(22) Filed: Dec. 28, 2023

(65) Prior Publication Data

US 2024/0123733 A1 Apr. 18, 2024

Related U.S. Application Data

(63) Continuation of application No. PCT/JP2022/025699, filed on Jun. 28, 2022.

(30) Foreign Application Priority Data

Jun. 29, 2021 (JP) ................................ 2021-107283

(51) Int. Cl.
*B41J 2/165* (2006.01)

(52) U.S. Cl.
CPC ....... *B41J 2/16541* (2013.01); *B41J 2/16538* (2013.01); *B41J 2/16552* (2013.01); *B41J 2002/16558* (2013.01)

(58) Field of Classification Search
CPC ......................... B41J 2/16541; B41J 2/16538; B41J 2/16552; B41J 2002/16558
See application file for complete search history.

(56) References Cited

U.S. PATENT DOCUMENTS 10,457,053 B2 * 10/2019 Okuno ................. B41J 2/16538
12,011,929 B2 * 6/2024 Shinomiya ........... B41J 2/16538
2009/0051730 A1 2/2009 Nakatani
2015/0336387 A1 11/2015 Miyazaki
(Continued)

FOREIGN PATENT DOCUMENTS

JP 2006-272579 A 10/2006
JP 2009018249 A 1/2009
JP 2009-297966 A 12/2009
(Continued)

OTHER PUBLICATIONS

Official Communication issued in International Patent Application No. PCT/JP2022/025699, mailed on Aug. 9, 2022.

*Primary Examiner* — Sharon Polk
(74) *Attorney, Agent, or Firm* — Keating & Bennett, LLP

(57) ABSTRACT

A printer includes an ink head including a nozzle surface, a wiper to wipe the nozzle surface at a first position, a remover to remove an attachment upon contacting the wiper at a second position, an applier to apply a cleaning fluid to the wiper at a third position, a mover to move the wiper to the first to third positions, and a controller configured or programmed to include a first prior removal controller to bring the wiper into contact with the remover at the second position, an application controller to cause the applier to apply the cleaning fluid to the wiper at the third position after control has been exercised by the first prior removal controller, and a first wiping controller to wipe the nozzle surface with the wiper at the first position after control has been exercised by the application controller.

16 Claims, 22 Drawing Sheets

(56) References Cited

U.S. PATENT DOCUMENTS

| | | | |
|---|---|---|---|
| 2019/0030899 | A1 | 1/2019 | Okuno et al. |

FOREIGN PATENT DOCUMENTS

| | | | |
|---|---|---|---|
| JP | 2013-154490 | A | 8/2013 |
| JP | 2016-000516 | A | 1/2016 |
| JP | 2017-043052 | A | 3/2017 |
| JP | 2017-159568 | A | 9/2017 |
| JP | 2019-025719 | A | 2/2019 |
| JP | 2020059188 | A | 4/2020 |

* cited by examiner

PRINTER

CROSS REFERENCE TO RELATED APPLICATIONS

This application claims the benefit of priority to Japanese Patent Application No. 2021-107283 filed on Jun. 29, 2021 and is a Continuation Application of PCT Application No. PCT/JP2022/025699 filed on Jun. 28, 2022. The entire contents of each application are hereby incorporated herein by reference.

BACKGROUND OF THE INVENTION

1. Field of the Invention

The present invention relates to printers.

2. Description of the Related Art

JP 2017-043052 A, for example, discloses an inkjet printer including an ink head. The ink head includes a nozzle surface provided with a nozzle to discharge ink. The ink may adhere to the nozzle surface. With the aim of cleaning the nozzle surface, the inkjet printer includes: a wiper to wipe the nozzle surface; a cleaning instrument to apply a cleaning fluid to the wiper; and a remover to remove a predetermined amount of the cleaning fluid applied to the wiper.

A process for cleaning the nozzle surface first involves using the cleaning instrument so as to apply the cleaning fluid to the wiper. After applying the cleaning fluid to the wiper, the process involves bringing the wiper into contact with the remover. The remover thus removes the cleaning fluid applied to the wiper. During this removing operation, an attachment (such as ink) adhering to the wiper is removed together with the cleaning fluid such that the wiper is cleaned. The process then involves wiping the nozzle surface with the wiper having the cleaning fluid removed therefrom, with the result that the ink adhering to the nozzle surface is wiped out by the wiper.

SUMMARY OF THE INVENTION

Ink adhering to a nozzle surface may be cured. Ink may increase in viscosity by being half-cured. Ink that is half-cured and increased in viscosity may hereinafter be referred to as "viscous ink". A nozzle surface may be cleaned to remove viscous ink adhering to the nozzle surface. An approach to removing such viscous ink from a nozzle surface involves, as described in JP 2017-043052 A, applying a cleaning fluid to a wiper, removing, with a remover, the cleaning fluid applied to the wiper, and then wiping the nozzle surface with the wiper. Such an approach, however, may fail to successfully remove the viscous ink from the nozzle surface, so that some of the viscous ink may remain on the nozzle surface. Although printing would be possible if some of the viscous ink remains on the nozzle surface, the viscous ink is preferably less prone to remain on the nozzle surface.

Accordingly, example embodiments of the present invention provide printers each of which is able to successfully remove viscous ink adhering to a nozzle surface.

The inventor of the present application has conducted various studies on ways to successfully remove viscous ink adhering to a nozzle surface. As a result of the studies, the inventor of the present application has discovered that in order to successfully remove viscous ink adhering to a nozzle surface, a cleaning fluid is advisably applied to the viscous ink.

An example embodiment of the present invention provides a printer including an ink head, a wiper, a remover, an applier, a mover, and a controller. The ink head includes a nozzle surface provided with a nozzle to discharge ink. The wiper wipes the nozzle surface at a first position. The remover removes an attachment adhering to the wiper upon contacting the wiper at a second position. The applier applies a cleaning fluid to the wiper at a third position. The mover moves the wiper and the ink head relative to each other such that the wiper and the ink head are located at the first position, moves the wiper and the remover relative to each other such that the wiper and the remover are located at the second position, and moves the wiper and the applier relative to each other such that the wiper and the applier are located at the third position. The controller is configured or programmed to include a first cleaning executor configured or programmed to execute a first cleaning process. The first cleaning executor is configured or programmed to include a first prior removal controller, an application controller, and a first wiping controller. The first prior removal controller is configured or programmed to exercise control such that the wiper comes into contact with the remover at the second position. The application controller is configured or programmed to exercise control such that the applier applies the cleaning fluid to the wiper at the third position after the control has been exercised by the first prior removal controller. The first wiping controller is configured or programmed to exercise control such that the nozzle surface is wiped with the wiper at the first position after the control has been exercised by the application controller.

In the above example embodiment, the applier applies the cleaning fluid to the wiper from which an attachment has been removed with the remover. The nozzle surface is wiped with the wiper having the cleaning fluid applied thereto, and the cleaning fluid applied to the wiper thus sticks to, for example, viscous ink adhering to the nozzle surface. This facilitates removing the viscous ink from the nozzle surface with the cleaning fluid. Accordingly, the printer according to the above example embodiment is able to successfully remove the viscous ink adhering to the nozzle surface because the cleaning fluid applied to the wiper sticks to the viscous ink.

Another example embodiment of the present invention provides a printer including an ink head, a wiper, a remover, an applier, a mover, and a controller. The ink head includes a nozzle surface provided with a nozzle to discharge ink. The wiper wipes the nozzle surface at a first position. The remover removes an attachment adhering to the wiper upon contacting the wiper at a second position. The applier applies a cleaning fluid to the wiper at a third position. The mover moves the wiper and the ink head relative to each other such that the wiper and the ink head are located at the first position, moves the wiper and the remover relative to each other such that the wiper and the remover are located at the second position, and moves the wiper and the applier relative to each other such that the wiper and the applier are located at the third position. The controller is configured or programmed to include a first cleaning executor configured or programmed to execute a first cleaning process. The first cleaning executor is configured or programmed to include an application controller, a first wiping controller, and a first removal controller. The application controller is configured or programmed to exercise control such that the applier applies the cleaning fluid to the wiper at the third position.

The first wiping controller is configured or programmed to exercise control such that the nozzle surface is wiped with the wiper at the first position after the control has been exercised by the application controller. The first removal controller is configured or programmed to exercise control such that the wiper comes into contact with the remover at the second position after the control has been exercised by the first wiping controller.

In the above example embodiment, the nozzle surface is wiped with the wiper having the cleaning fluid applied thereto, and the cleaning fluid applied to the wiper thus sticks to, for example, viscous ink adhering to the nozzle surface. This facilitates removing the viscous ink from the nozzle surface with the cleaning fluid. Accordingly, the printer according to the above example embodiment is able to successfully remove the viscous ink adhering to the nozzle surface because the cleaning fluid applied to the wiper sticks to the viscous ink.

Various example embodiments of the present invention provide printers each of which is able to successfully remove viscous ink adhering to a nozzle surface.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of printers according to the present invention will be described below with reference to the drawings. The example embodiments described below are naturally not intended to limit the present invention in any way. Components and elements having the same functions will be identified by the same reference signs and will be described briefly or will not be described when deemed redundant.

First Example Embodiment

Figure 1:
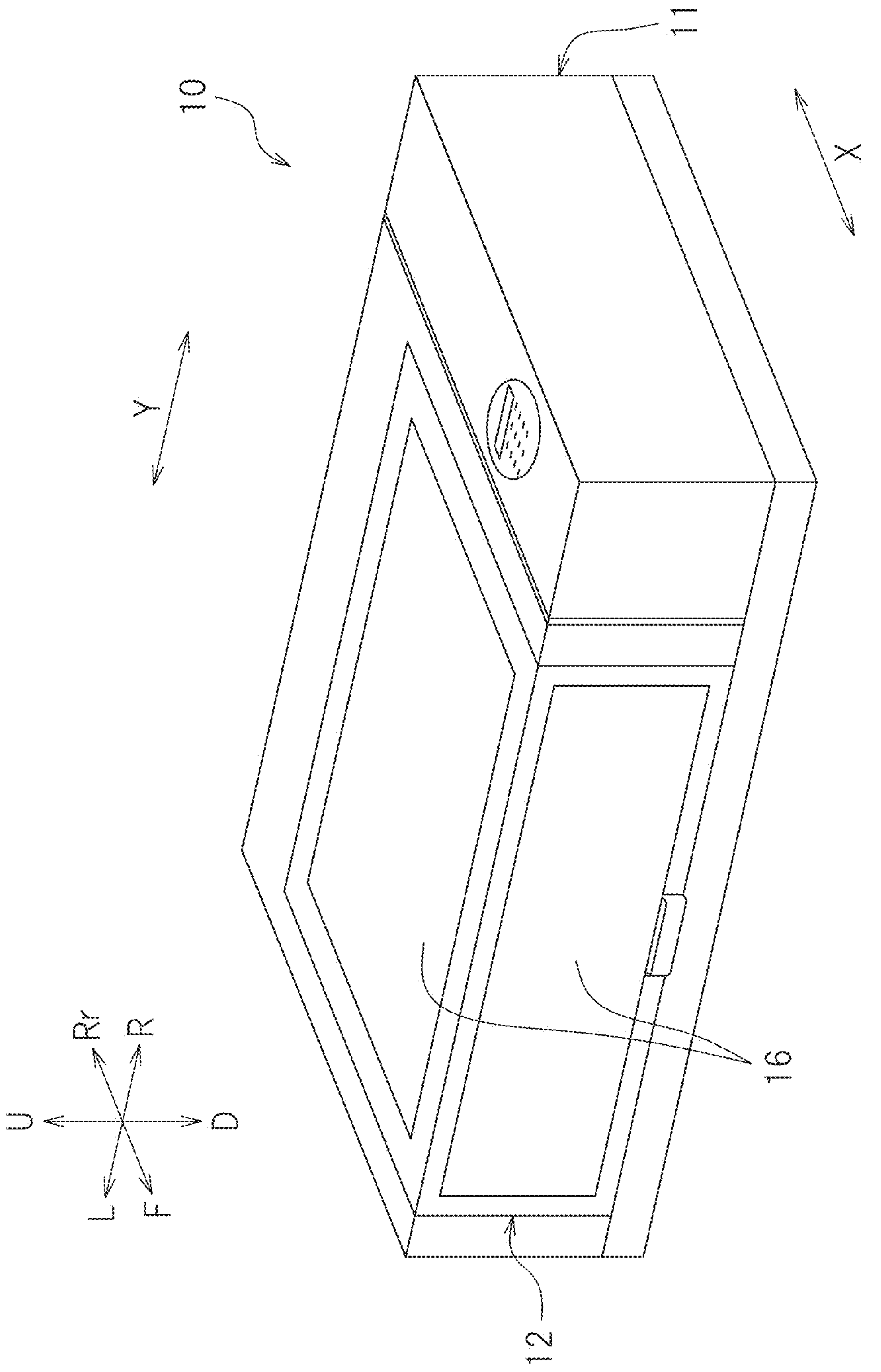
FIG. 1 is a perspective view of a printer according to a first example embodiment of the present invention.
Figure 2:
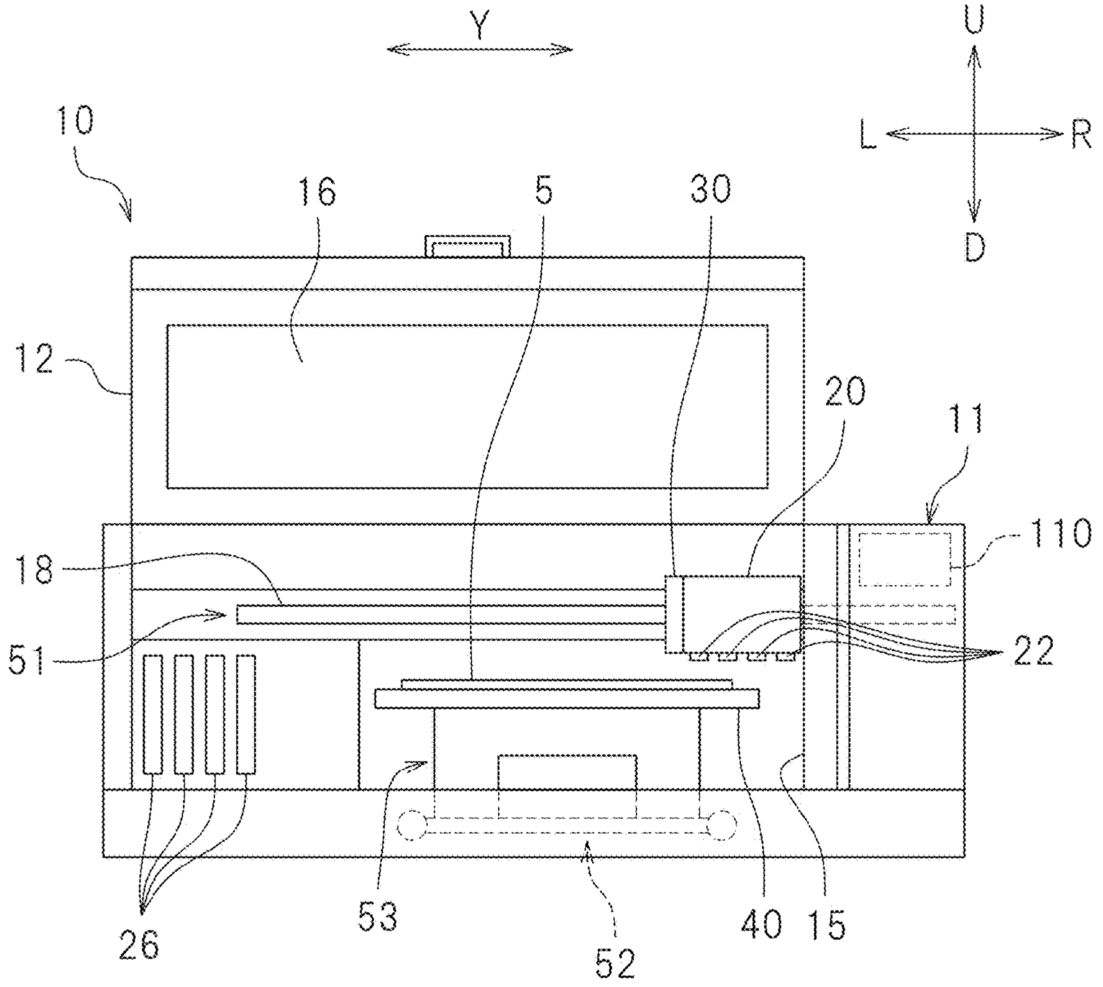
FIG. 2 is a front view of the printer, with its cover opened.
Figure 3:
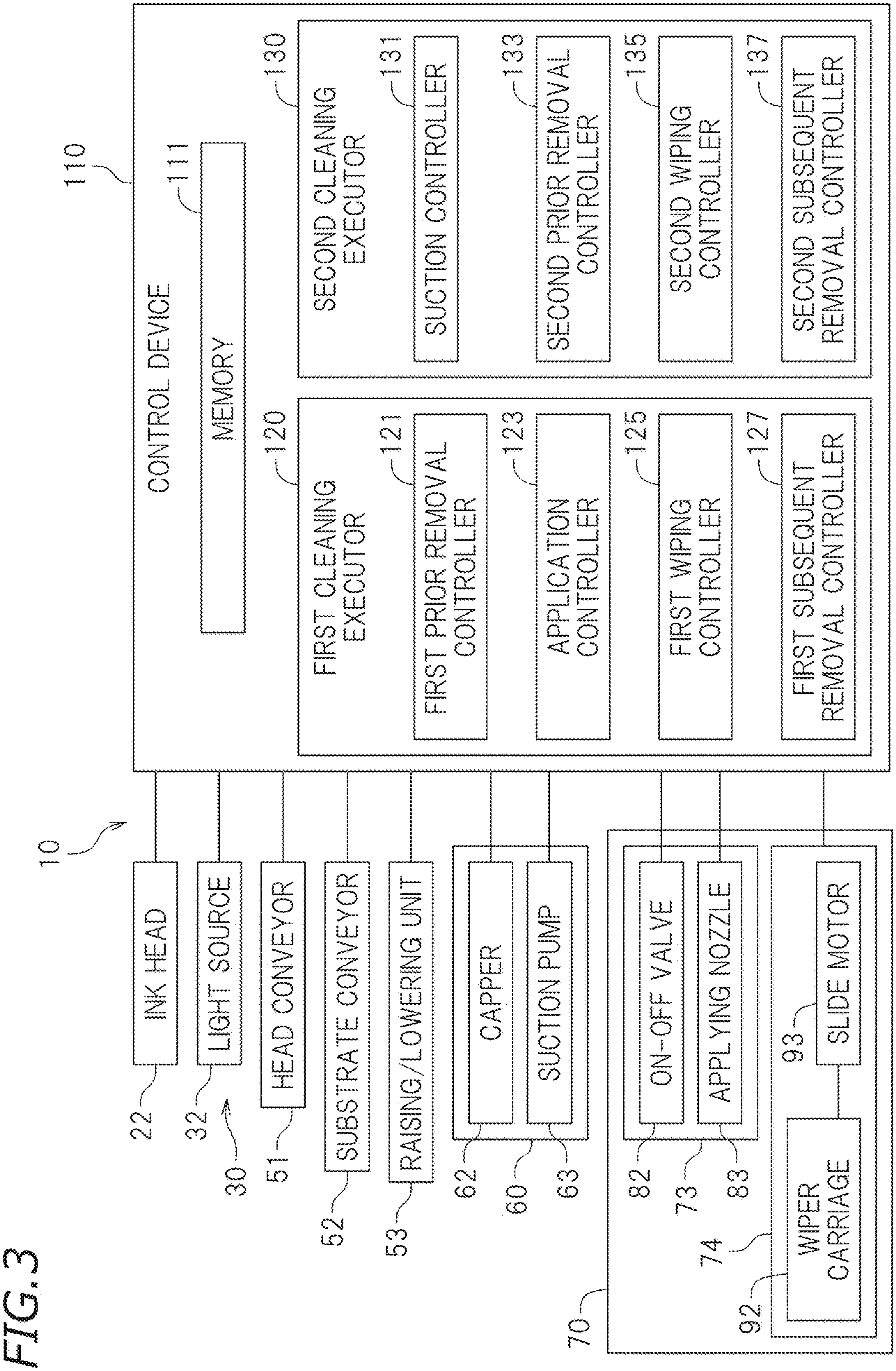
FIG. 3 is a block diagram of the printer according to the first example embodiment of the present invention.

A printer 10 according to a first example embodiment of the present invention will be described below. FIG. 1 is a perspective view of the printer 10 according to the first example embodiment. FIG. 2 is a front view of the printer 10 according to the first example embodiment. FIG. 3 is a block diagram of the printer 10 according to the first example embodiment. In the following description, the reference signs "F", "Rr", "L", "R", "U", and "D" in the drawings respectively represent forward, rearward, leftward, rightward, upward, and downward directions with respect to the printer 10. The reference sign "Y" in the drawings represents a main scanning direction. The reference sign "X" in the drawings represents a sub-scanning direction. The main scanning direction Y corresponds to, for example, a right-left direction. The sub-scanning direction X intersects with the main scanning direction Y in a plan view. In this example embodiment, the sub-scanning direction X is perpendicular or substantially perpendicular to the main scanning direction Y in the plan view. The sub-scanning direction X corresponds to, for example, a front-rear direction. These directions, however, are defined merely for the sake of convenience of description. These directions do not limit in any way how the printer 10 may be installed.

As illustrated in FIG. 2, the printer 10 discharges ink onto a substrate 5 so as to effect printing on the substrate 5. The substrate 5 is, for example, recording paper. The substrate 5, however, may be any type of substrate. Examples of the substrate 5 include: sheets made of resin materials, such as polyvinyl chloride (PVC) and polyester; and relatively thick plates, such as a metallic plate, a glass plate, and a wood plate. The substrate 5 may be a three-dimensional object, such as a smartphone case.

The printer 10 is an inkjet printer. In the first example embodiment, the printer 10 is a "flatbed printer". As illustrated in FIG. 2, a supporting table 40 (which will be described below) supports the substrate 5. Thus, movement of the supporting table 40 in the sub-scanning direction X causes the substrate 5 to move in the sub-scanning direction X. Alternatively, the printer 10 may be a "roll-to-roll printer". In this case, the substrate 5 in a roll form may be unrolled in the sub-scanning direction X without involving movement of the supporting table 40.

As illustrated in FIG. 1, the printer 10 includes a case 11 and a cover 12. The case 11 has, for example, a cuboid shape and includes an internal space. In the internal space, printing is effected on the substrate 5. As illustrated in FIG. 2, the case 11 is provided at its front portion with an opening 15.

The cover 12 is supported by the case 11 so as to be able to open and close the opening 15. The cover 12 is rotatable around its rear end. As illustrated in FIG. 1, the cover 12 is provided at its front portion with a window 16 and is provided at its upper portion with another window 16. Each of the windows 16 is a transparent or semitransparent member, such as an acrylic plate. A user is able to visually check the internal space of the case 11 through the windows 16.

The following description discusses an internal structure of the printer 10. As illustrated in FIG. 2, the printer 10 includes a guide rail 18, a carriage 20, ink heads 22, a light applicator 30, and the supporting table 40.

The guide rail 18 is secured to the case 11 in the internal space of the case 11. The guide rail 18 extends in the main scanning direction Y. The carriage 20 is in slidable engagement with the guide rail 18. The carriage 20 is movable in the main scanning direction Y along the guide rail 18.

The ink heads 22 each discharge ink onto the substrate 5 supported by the supporting table 40. The ink heads 22 are mounted on the carriage 20. The ink heads 22 are movable in the main scanning direction Y together with the carriage 20. The number of ink heads 22 may be any suitable number. In the first example embodiment, the number of ink heads 22 is four. The four ink heads 22 are disposed side by side in the main scanning direction Y.

Figure 4:
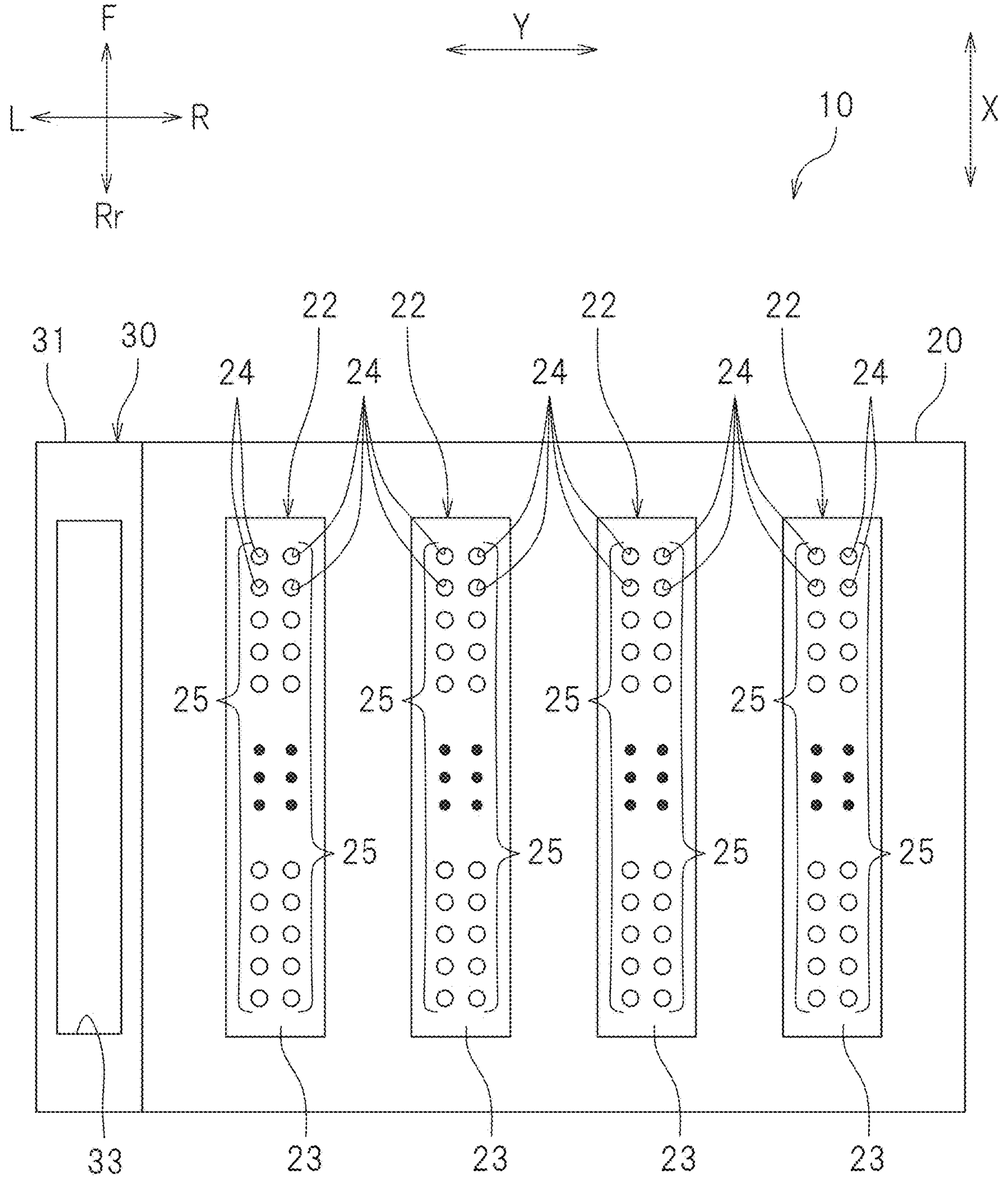
FIG. 4 is a bottom view of a carriage, ink heads, and a light applicator.

FIG. 4 is a bottom view of the carriage 20, the ink heads 22, and the light applicator 30. As illustrated in FIG. 4, the ink heads 22 each include a nozzle surface 23. The nozzle surfaces 23 define bottom surfaces of the ink heads 22. The nozzle surfaces 23 are exposed downward from the carriage 20. Each of the nozzle surfaces 23 is provided with nozzles 24. In the first example embodiment, the nozzles 24 of each of the nozzle surfaces 23 are aligned in rows in the sub-scanning direction X. The nozzles 24 aligned in a row in the sub-scanning direction X will hereinafter be referred to as a "nozzle row 25". In the first example embodiment, the number of nozzle rows 25 of each nozzle surface 23 is two. Alternatively, the number of nozzle rows 25 of each nozzle surface 23 may be one or may be three or more.

In the first example embodiment, ink to be discharged from the nozzles 24 differs in color for each of the ink heads 22. Alternatively, the ink to be discharged from the nozzles 24 may differ in color for each of the nozzle rows 25. The ink to be discharged from the nozzles 24 is, for example, process color ink or spot color ink. Examples of process color ink include cyan ink, magenta ink, yellow ink, and black ink. As used herein, the term "spot color ink" refers to ink of color other than those of process color ink. Examples of spot color ink include white ink, clear ink, gloss ink, primer ink, fluorescent ink, metallic ink, orange ink, red ink, violet ink, blue ink, and green ink.

The ink to be discharged from the nozzles 24 of the ink heads 22 is photo-curable ink whose drying is promoted by exposure to light. Examples of light include ultraviolet light. The ink used in this example embodiment is, for example, ultraviolet-curable ink whose drying is promoted by exposure to ultraviolet light. Alternatively, any other suitable type of ink, such as water-based ink, may be used.

In the first example embodiment, the ink to be discharged from the ink heads 22 is stored in ink cartridges 26 illustrated in FIG. 2. The ink cartridges 26 are disposed, for example, in the internal space of the case 11. The ink cartridges 26 are each connected to, for example, an associated one of the ink heads 22. Alternatively, the ink cartridges 26 may each be connected to an associated one of the nozzle rows 25. The ink cartridges 26 are connected to the ink heads 22 through, for example, tubes (not illustrated). The ink stored in the ink cartridges 26 is supplied to the ink heads 22 through the tubes.

The light applicator 30 applies light to the ink discharged from the nozzles 24 of the ink heads 22. The light applicator 30 is able to apply light to the ink discharged onto the substrate 5 supported by the supporting table 40. In the first example embodiment, the ink discharged from the nozzles 24 is ultraviolet-curable ink as previously mentioned. Accordingly, the light applicator 30 is an ultraviolet light applicator to apply ultraviolet light to the ink discharged from the nozzles 24. Alternatively, the light applicator 30 may be an infrared light applicator to apply infrared light to the ink discharged from the nozzles 24. In this case, the ink to be discharged from the nozzles 24 of the ink heads 22 may be "water-based ink".

As illustrated in FIG. 4, the light applicator 30 is mounted on the carriage 20. The light applicator 30 is movable in the main scanning direction Y together with the carriage 20 and the ink heads 22. In the first example embodiment, the light applicator 30 is disposed on a first side in the main scanning direction Y relative to the carriage 20 and the ink heads 22. In the example illustrated in FIG. 4, the light applicator 30 is disposed leftward of the carriage 20 and the ink heads 22. Alternatively, the light applicator 30 may be disposed on a second side in the main scanning direction Y relative to the carriage 20 and the ink heads 22. In this case, the light applicator 30 may be disposed rightward of the carriage 20 and the ink heads 22. In FIG. 4, the printer 10 is illustrated as including one light applicator 30. Alternatively, the printer 10 may include more than one light applicator 30 (e.g., two light applicators 30). One or more light applicators 30 may be mounted on a right portion of the carriage 20, and one or more light applicators 30 may be mounted on a left portion of the carriage 20.

The light applicator 30 is not limited to any particular configuration, structure, or arrangement. In the first example embodiment, the light applicator 30 includes an applicator body 31 (see FIG. 4) and a light source 32 (see FIG. 3). As illustrated in FIG. 4, the applicator body 31 has, for example, a cuboid shape. The applicator body 31 is hollow. The applicator body 31 includes a bottom surface provided with an application port 33. The application port 33 has a rectangular or substantially rectangular shape, for example. Alternatively, the application port 33 may have any other suitable shape. The light source 32 emits light (which is ultraviolet light in this example embodiment). The light source 32 is disposed inside the applicator body 31. The light emitted from the light source 32 passes through the application port 33 and is applied to the ink discharged onto the substrate 5.

As illustrated in FIG. 2, the supporting table 40 supports the substrate 5. The substrate 5 is placed on an upper surface of the supporting table 40. The printer 10 effects printing on the substrate 5 placed on the supporting table 40. The upper surface of the supporting table 40 extends in the main scanning direction Y and the sub-scanning direction X.

In the first example embodiment, the printer 10 includes a head conveyor 51 and a substrate conveyor 52 as illustrated in FIG. 2. The head conveyor 51 moves the ink heads 22 in the main scanning direction Y relative to the supporting table 40. The substrate conveyor 52 moves the substrate 5, which is supported by the supporting table 40, in the sub-scanning direction X relative to the ink heads 22. Although not described in detail, the printer 10 further includes a raising/lowering unit 53 to raise and lower the supporting table 40.

The head conveyor 51 moves the carriage 20, the ink heads 22, and the light applicator 30 in the main scanning direction Y along the guide rail 18. The head conveyor 51 is not limited to any particular configuration, structure, or arrangement. Although not illustrated, the head conveyor 51 includes, for example, right and left pulleys, a belt, and a scan motor. The left pulley is provided around a left end of the guide rail 18. The right pulley is provided around a right end of the guide rail 18. The belt is, for example, an endless belt. The belt is wound around the right and left pulleys. The carriage 20 is secured to the belt. The scan motor is connected to one of the right and left pulleys. Driving the scan motor rotates the pulleys so as to cause the belt to run between the right and left pulleys. The running of the belt moves the carriage 20, the ink heads 22, and the light applicator 30 in the main scanning direction Y along the guide rail 18.

The substrate conveyor 52 moves the supporting table 40 in the sub-scanning direction X so as to move the substrate 5, which is supported by the supporting table 40, in the sub-scanning direction X. The substrate conveyor 52 is not limited to any particular configuration, structure, or arrangement. Although not illustrated, the substrate conveyor 52 includes a supporting table carriage and a pair of right and left slide rails. The supporting table carriage supports the supporting table 40. The slide rails support the supporting table carriage such that the supporting table carriage is slidable along the slide rails. The slide rails extend in the sub-scanning direction X. Although not illustrated, the substrate conveyor 52 further includes a pair of front and rear slide pulleys and a slide belt. The front slide pulley is provided in front of the slide rails. The rear slide pulley is provided behind the slide rails. The slide belt is wound around the front and rear slide pulleys. The supporting table carriage is secured to the slide belt. A feed motor is connected to one of the front and rear slide pulleys. Driving the feed motor causes the slide belt to run so as to move the supporting table 40 in the sub-scanning direction X together with the supporting table carriage.

Figure 5:
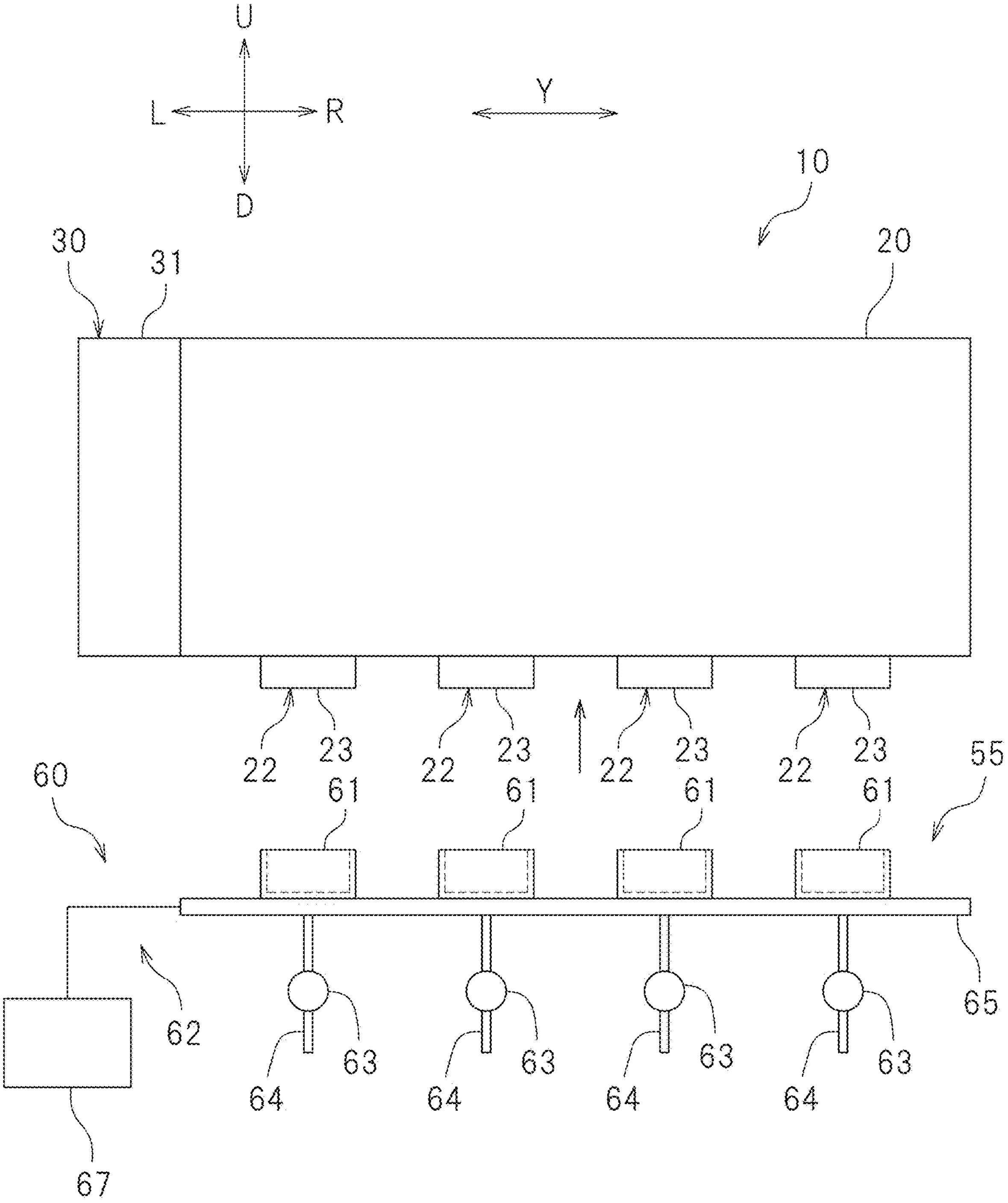
FIG. 5 is a front view of the carriage and a capping device.
Figure 6:
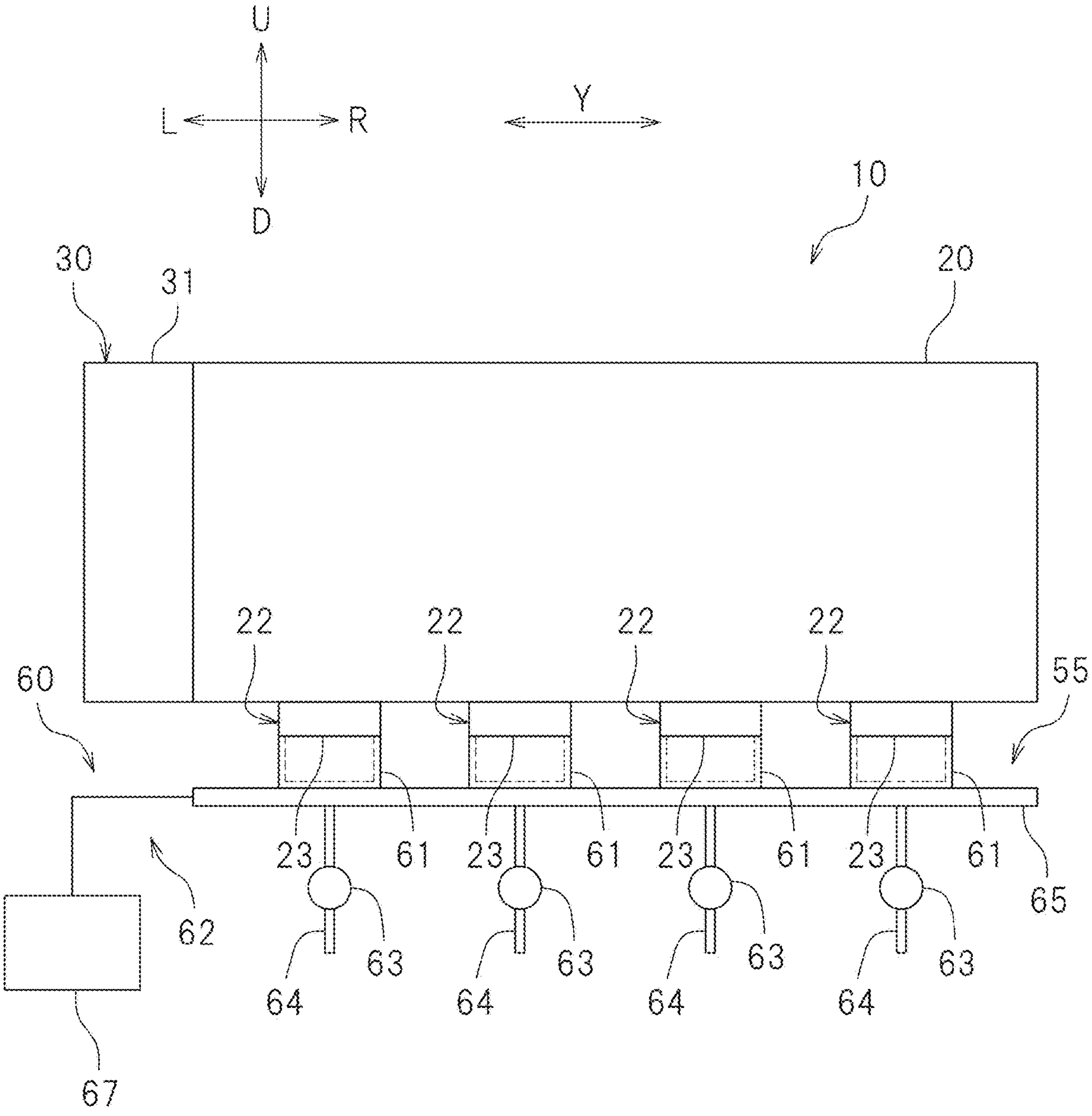
FIG. 6 is a front view of the carriage and the capping device.
Figure 7:
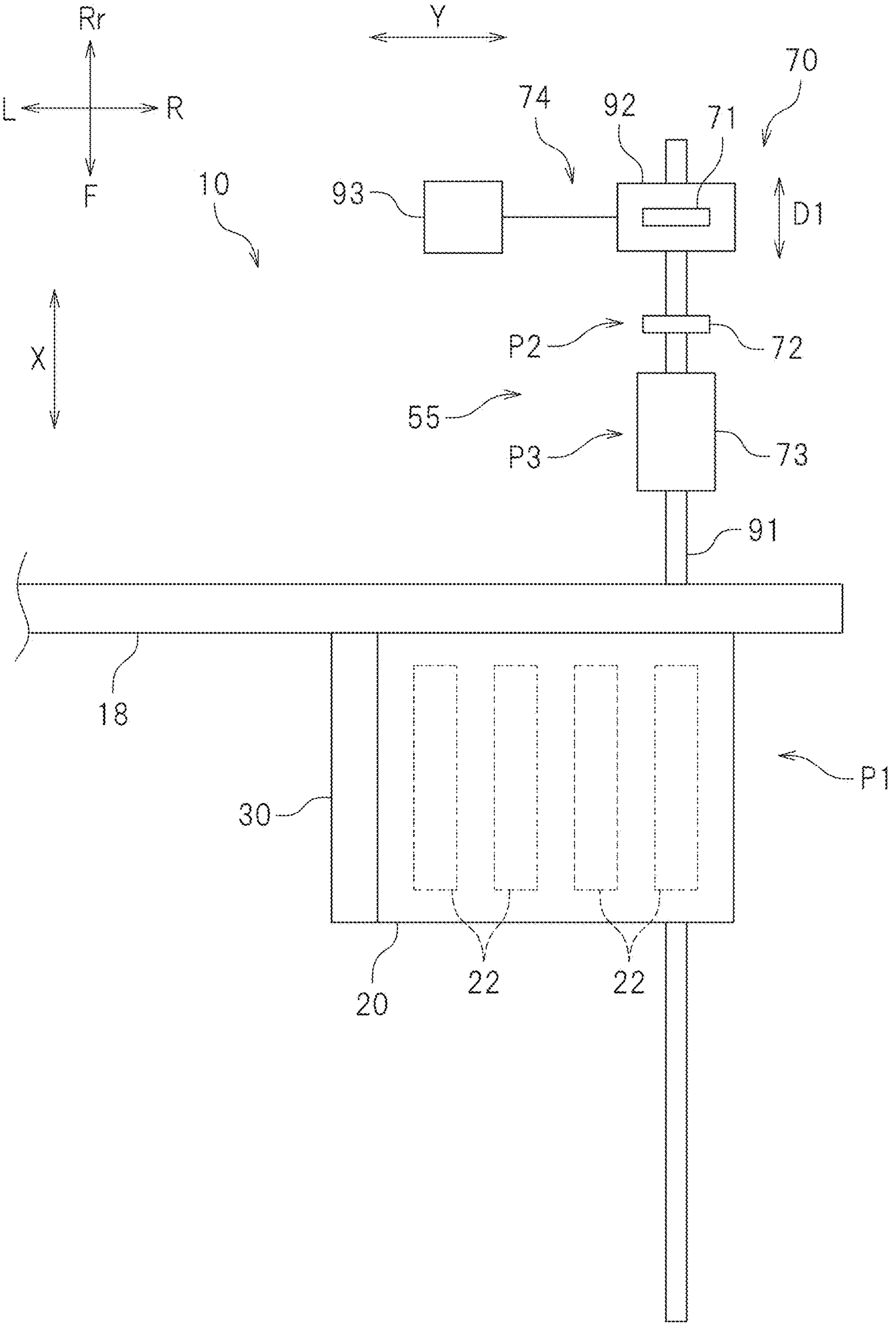
FIG. 7 is a schematic plan view of the carriage and a wiping device.
Figure 8:
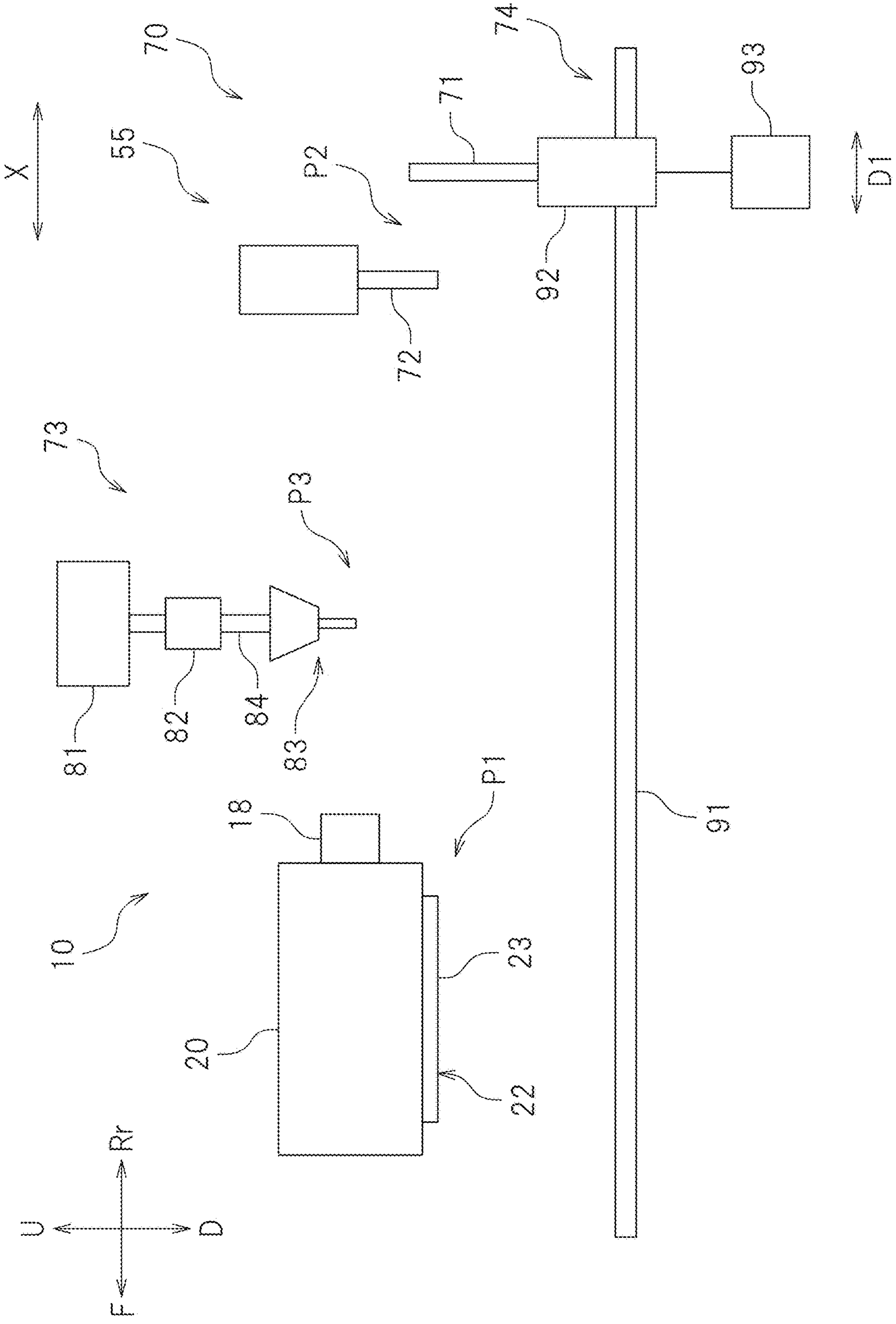
FIG. 8 is a schematic right side view of the carriage and the wiping device.

FIGS. 5 and 6 are front views of the carriage 20 and a capping device 60 of a cleaning unit 55. FIG. 7 is a schematic plan view of the carriage 20 and a wiping device 70 of the cleaning unit 55. FIG. 8 is a schematic right side view of the carriage 20 and the wiping device 70. As illustrated in FIGS. 5 and 7, the printer 10 includes the cleaning unit 55. The cleaning unit 55 cleans the ink heads 22. The cleaning unit 55 includes the capping device 60 (see FIG. 5) and the wiping device 70 (see FIG. 7).

The capping device 60 illustrated in FIG. 5 is disposed leftward or rightward of the supporting table 40. The first example embodiment involves setting a home position where the ink heads 22 are put on standby during non-printing mode. The home position is located, for example, around the right end of the guide rail 18. The capping device 60 is disposed at the home position. As illustrated in FIG. 5, the capping device 60 includes caps 61, a capper 62, and suction pumps 63.

The caps 61 are attachable to the ink heads 22 so as to cover the nozzles 24 (see FIG. 4) of the ink heads 22. Each of the caps 61 is attached to an associated one of the ink heads 22. Thus, the number of caps 61 is equal to the number of ink heads 22, which means that the number of caps 61 is four. Alternatively, each of the caps 61 may be attached to more than one ink head 22. In one example, one cap 61 may be attached to all of the four ink heads 22.

The capper 62 raises and lowers the caps 61 so as to attach and detach the caps 61 to and from the ink heads 22. In one example, the capper 62 raises the caps 61 such that the caps 61 are attached to the ink heads 22 as illustrated in FIG. 6, and lowers the caps 61 such that the caps 61 are detached from the ink heads 22 as illustrated in FIG. 5.

The capper 62 is not limited to any particular configuration, structure, or arrangement. The capper 62 includes a supporting member 65 and a raising and lowering motor 67. The supporting member 65 is, for example, a plate member extending in the main scanning direction Y and the sub-scanning direction X. The supporting member 65 supports the four caps 61. The raising and lowering motor 67 is connected to the supporting member 65. Driving the raising and lowering motor 67 raises and lowers the supporting member 65. The raising and lowering of the supporting member 65 raises and lowers the four caps 61 simultaneously.

As illustrated in FIG. 5, the suction pumps 63 are connected to the caps 61. Each of the suction pumps 63 is connected to an associated one of the caps 61. Thus, the number of suction pumps 63 is equal to the number of caps 61, which means that the number of suction pumps 63 is four. The suction pumps 63 suck ink inside the caps 61 to which the suction pumps 63 are connected, and/or ink inside the ink heads 22 attached to the caps 61 to which the suction pumps 63 are connected.

Each of the suction pumps 63 is provided at a location somewhere along an associated one of tubes 64. Thus, the number of tubes 64 is four. A first end of each of the tubes 64 is connected to an associated one of the caps 61. A second end of each of the tubes 64 is connected to a waste fluid tank (not illustrated). The number of waste fluid tanks is, for example, one. The waste fluid tank is connected to the four caps 61 through the four tubes 64. For example, upon driving the suction pumps 63, with the caps 61 attached to the ink heads 22, ink is sucked from the nozzles 24 (see FIG. 4) and then discharged to the caps 61. A waste fluid, such as the ink sucked into the caps 61 by the suction pumps 63, is discharged to the waste fluid tank through the tubes 64.

The wiping device 70 illustrated in FIGS. 7 and 8 wipes the nozzle surfaces 23 of the ink heads 22. The wiping device 70 is disposed adjacent to the capping device 60. At least a portion of the wiping device 70 is located below the ink heads 22. The wiping device 70 is located at the home position where the ink heads 22 are put on standby during non-printing mode. As illustrated in FIG. 8, the wiping device 70 is disposed, for example, around the right end of the guide rail 18. The wiping device 70 includes a wiper 71, a remover 72, an applier 73, and a mover 74.

Figure 9:
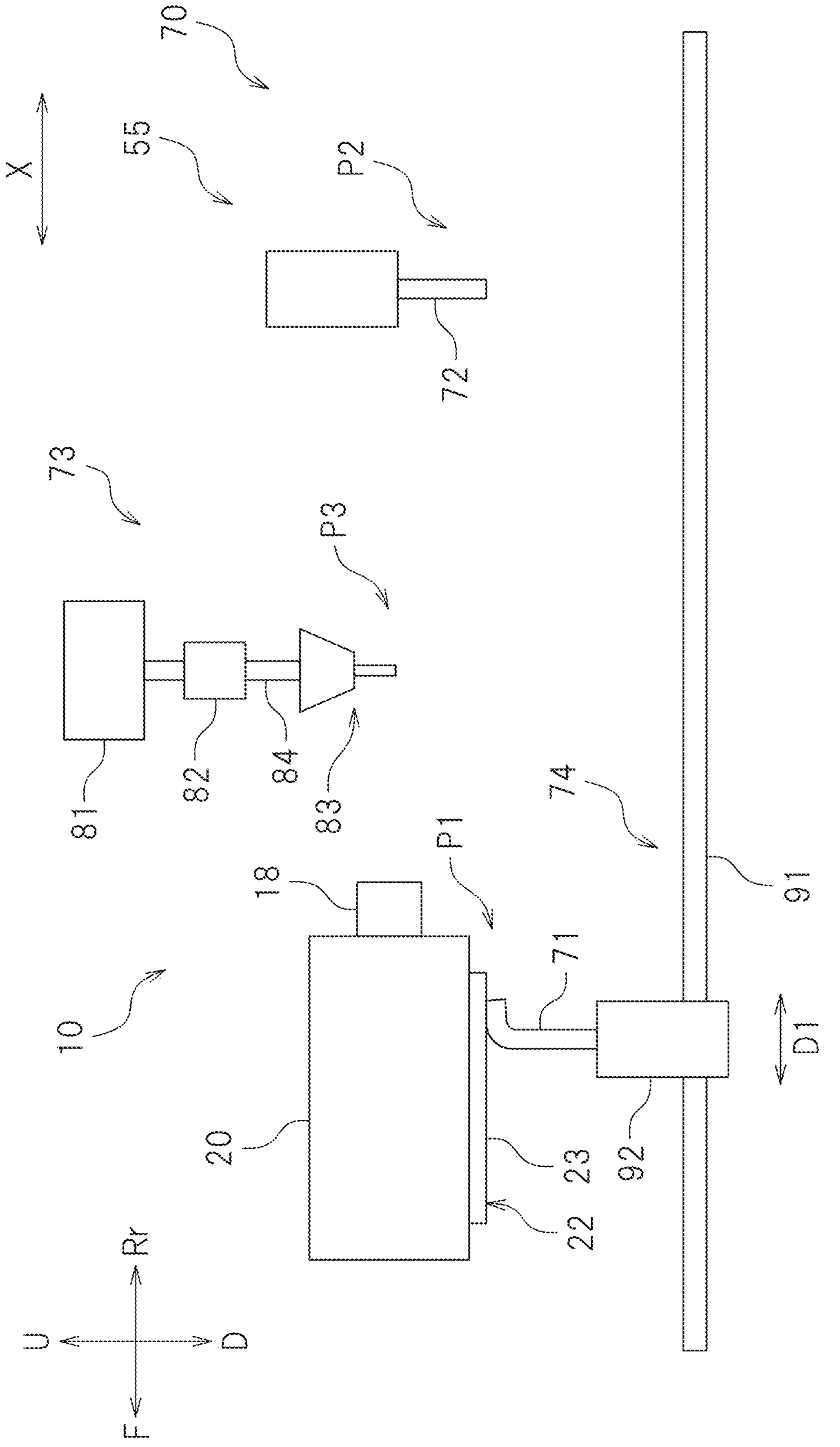
FIG. 9 is a schematic right side view of the carriage and the wiping device, with its wiper located at a wiping position.

FIG. 9 is a schematic right side view of the carriage 20 and the wiping device 70, with the wiper 71 located at a wiping position P1. As illustrated in FIG. 9, the wiper 71 wipes the nozzle surfaces 23 of the ink heads 22. In the first example embodiment, the wiper 71 is a flat plate member extending in the main scanning direction Y and an up-down direction as illustrated in FIGS. 7 and 8.

The wiper 71 may be made of any suitable material. The wiper 71 is made of, for example, an elastic material, such as rubber. In the first example embodiment, the wiping device 70 is provided with one wiper 71 and configured to be able to sequentially wipe the nozzle surfaces 23 of all of the ink heads 22 with the single wiper 71. A length of the wiper 71 in the main scanning direction Y is equal to or longer than a length of each of the nozzle surfaces 23 in the main scanning direction Y. In an alternative example, the wiping device 70 may be provided with more than one wiper 71 (e.g., four wipers 71) and may be configured such that each of the wipers 71 wipes the nozzle surface 23 of an associated one of the ink heads 22. In another alternative example, the wiping device 70 may be configured such that one wiper 71 wipes the nozzle surfaces 23 of all of the ink heads 22 at a time.

In the first example embodiment, the wiper 71 is disposed such that an extremity of the wiper 71 (i.e., an upper end of the wiper 71 in this example embodiment) is located slightly above the nozzle surfaces 23 as illustrated in FIG. 8. In this state, the wiper 71 moves in a predetermined moving direction D1 relative to the ink heads 22. As illustrated in FIG. 9, the extremity of the wiper 71 comes into contact with the target nozzle surface 23 while being bent, and the wiper 71 then moves in the moving direction D1, with the extremity of the wiper 71 in contact with the target nozzle surface 23. As a result of this operation, the target nozzle surface 23 is wiped with the wiper 71. In the first example embodiment, the moving direction D1 corresponds to the front-rear direction (i.e., the sub-scanning direction X). The moving direction D1, however, is not limited to the front-rear direction.

Ink may adhere to, for example, the nozzle surface(s) 23 of the ink head(s) 22. Together with ink, dirt and/or dust may adhere to the nozzle surface(s) 23. Ink, dirt, and dust adhering to the nozzle surface(s) 23 will be collectively referred to as an “attachment”. When the nozzle surfaces 23 are wiped with the wiper 71, an attachment adhering to the nozzle surface(s) 23 may adhere to the wiper 71. The remover 72 serves to remove the attachment adhering to the wiper 71. In this example embodiment, the wiper 71 is brought into contact with the remover 72 so as to remove the attachment adhering to a portion of the wiper 71 in contact with the remover 72.

In the first example embodiment, the remover 72 is a flat plate member extending in the main scanning direction Y and the up-down direction as illustrated in FIGS. 7 and 8. A length of the remover 72 in the main scanning direction Y is equal to or longer than the length of the wiper 71 in the main scanning direction Y. The remover 72 may have any suitable shape. The remover 72 may be made of any suitable material. In the first example embodiment, the remover 72 is made of a porous material. The remover 72 is, for example, an absorber that comes into contact with the wiper 71 so as to absorb ink adhering to the wiper 71 and thus remove an attachment from the wiper 71. The remover 72 is made of, for example, a material harder than that of the wiper 71.

Figure 10:
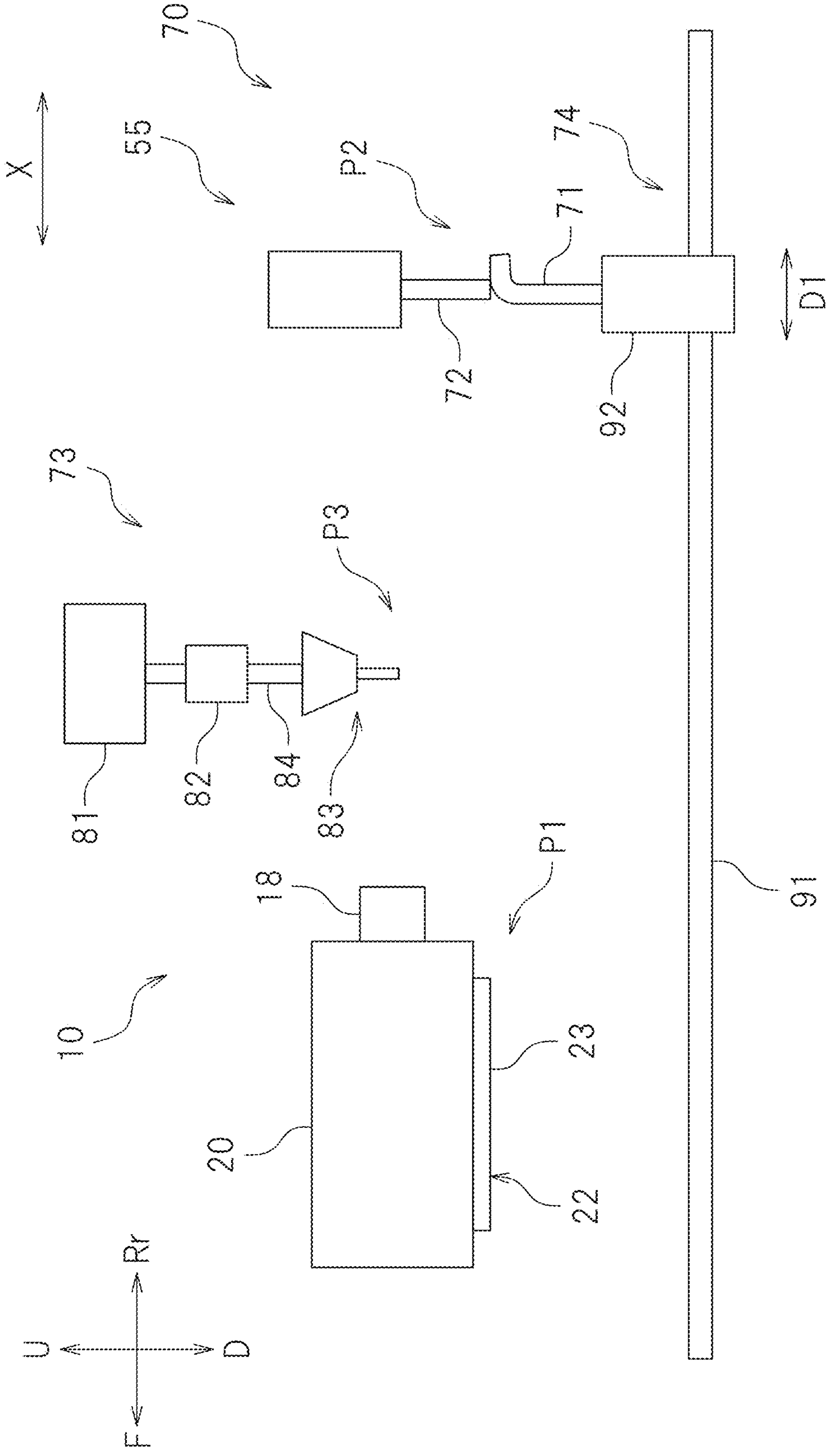
FIG. 10 is a schematic right side view of the carriage and the wiping device, with its wiper located at a removing position.

FIG. 10 is a schematic right side view of the carriage 20 and the wiping device 70, with the wiper 71 located at a removing position P2. In the first example embodiment, the remover 72 is disposed at a height at which a lower end of the remover 72 overlaps with the extremity of the wiper 71 in the up-down direction when viewed in the front-rear direction as illustrated in FIG. 8. Although not illustrated, the remover 72 is secured to the case 11 (see FIG. 2). As illustrated in FIG. 10, with the lower end of the remover 72 in contact with the extremity of the wiper 71, the wiper 71 moves in the moving direction D1. During this movement, the extremity of the wiper 71 is bent such that an attachment adhering to the extremity of the wiper 71 adheres to the remover 72 and is thus removed from the extremity of the wiper 71.

Figure 11:
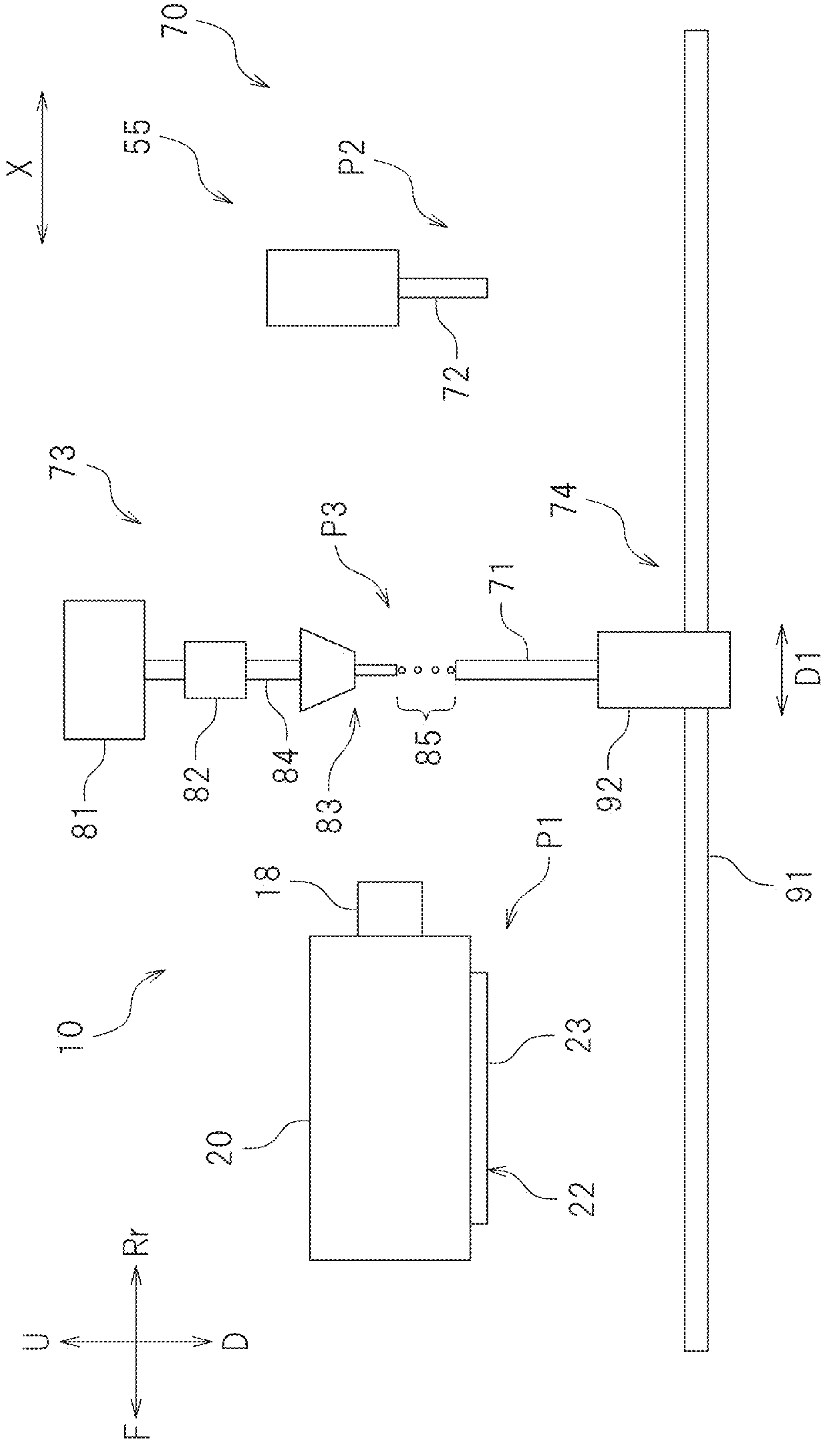
FIG. 11 is a schematic right side view of the carriage and the wiping device, with its wiper located at an applying position.

FIG. 11 is a schematic right side view of the carriage 20 and the wiping device 70, with the wiper 71 located at an applying position P3. As illustrated in FIG. 11, the applier 73 applies a cleaning fluid 85 to the wiper 71. The cleaning fluid 85 includes a surfactant. When the cleaning fluid 85 is used on an ultraviolet-curable ink or a solvent ink, the cleaning fluid 85 may include an organic solvent, such as dialkylene glycol dialkyl ether or diethylene diethyl ether. In the first example embodiment, the wiper 71 is movable to a position under the applier 73 such that the cleaning fluid 85 is dropped on the wiper 71 from above and is thus applied to the wiper 71.

The applier 73 is not limited to any particular configuration, structure, or arrangement. In the first example embodiment, the applier 73 includes a container 81, an on-off valve 82, and an applying nozzle 83. The container 81 stores the cleaning fluid 85. The container 81 is, for example, in the form of a pouch that may have any suitable shape. The on-off valve 82 is openable and closable and adjusts the amount of cleaning fluid 85 to be applied to the wiper 71. The on-off valve 82 is what is known as an electromagnetic valve and is opened and closed electrically.

The applying nozzle 83 is disposed above the wiper 71. The applying nozzle 83 discharges the cleaning fluid 85 onto the wiper 71 such that the cleaning fluid 85 is applied to the wiper 71. The applying nozzle 83 may have any suitable shape. In this example embodiment, the applying nozzle 83 has a rod shape extending in the up-down direction. Alternatively, the applying nozzle 83 may have a hemispherical shape with a hemispherical surface protruding downward, or may have a semicylindrical shape with a curved surface protruding downward. Although not illustrated, the applying nozzle 83 is secured to the case 11 (see FIG. 2).

In the first example embodiment, the applying nozzle 83 is connected to the container 81 through the on-off valve 82. The applier 73 includes a supply passage 84 through which the cleaning fluid 85 flows. The supply passage 84 is made of, for example, a flexible material. In this example embodiment, the supply passage 84 includes a flexible tube. A first end of the supply passage 84 is connected to the container 81. A second end of the supply passage 84 is connected to the applying nozzle 83. The on-off valve 82 is provided at a location somewhere along the supply passage 84.

In the first example embodiment, when no cleaning fluid 85 is applied to the wiper 71, the on-off valve 82 is closed, which stops the cleaning fluid 85 from flowing through the supply passage 84. In this case, the cleaning fluid 85 stored in the container 81 is not supplied to the applying nozzle 83. When the cleaning fluid 85 is applied to the wiper 71, the on-off valve 82 is opened, which allows the cleaning fluid 85 to flow through the supply passage 84. In this case, the cleaning fluid 85 stored in the container 81 is supplied to the applying nozzle 83 through the supply passage 84. The cleaning fluid 85 supplied to the applying nozzle 83 is discharged from the applying nozzle 83 and applied to the wiper 71. In this example embodiment, the cleaning fluid 85 is discharged downward from the applying nozzle 83.

As used herein, the term “wiping position P1” refers to a position where the wiper 71 wipes the nozzle surfaces 23 of the ink heads 22 as illustrated in FIG. 9. As used herein, the term "removing position P2" refers to a position where the remover 72 removes an attachment adhering to the wiper 71 as illustrated in FIG. 10. The remover 72 is disposed at the removing position P2. As used herein, the term "applying position P3" refers to a position where the applier 73 applies the cleaning fluid 85 to the wiper 71 as illustrated in FIG. 11. At least the applying nozzle 83 of the applier 73 is disposed at the applying position P3. In the first example embodiment, the wiping position P1 corresponds to a first position, the removing position P2 corresponds to a second position, and the applying position P3 corresponds to a third position.

As illustrated in FIG. 7, the wiping position P1, the removing position P2, and the applying position P3 are located in a line in the moving direction D1 in a plan view. In other words, the wiping position P1, the removing position P2, and the applying position P3 are located in alignment with each other in the sub-scanning direction X in the plan view. Specifically, the removing position P2, the applying position P3, and the wiping position P1 are located in this order from the rear to the front. In this example embodiment, the wiping position P1 is located at the home position adjacent to the right end of the guide rail 18. The removing position P2 is located behind the wiping position P1. The applying position P3 is located behind the wiping position P1 and in front of the removing position P2. In this example embodiment, the applier 73 is disposed in front of the remover 72.

As illustrated in FIGS. 8 to 11, the mover 74 moves the wiper 71 relative to the ink heads 22, the remover 72, and the applier 73. In the first example embodiment, the mover 74 moves the wiper 71 and the target ink head 22 relative to each other such that the wiper 71 and the target ink head 22 are located at the wiping position P1, moves the wiper 71 and the remover 72 relative to each other such that the wiper 71 and the remover 72 are located at the removing position P2, and moves the wiper 71 and the applier 73 relative to each other such that the wiper 71 and the applier 73 are located at the applying position P3. The mover 74 moves the wiper 71 in the moving direction D1 (i.e., the sub-scanning direction X). The mover 74 is not limited to any particular configuration, structure, or arrangement.

In the first example embodiment, the mover 74 includes a slide rail 91, a wiper carriage 92, and a slide motor 93 as illustrated in FIG. 8. The slide rail 91 extends in the moving direction D1 (i.e., the sub-scanning direction X). The slide rail 91 is disposed to extend through the wiping position P1, the removing position P2, and the applying position P3. The slide rail 91 is disposed under the remover 72 and the applier 73 (or specifically, the applying nozzle 83). The slide rail 91 is disposed below the ink heads 22 in a side view.

The wiper carriage 92 is in slidable engagement with the slide rail 91. The wiper carriage 92 is movable in the moving direction D1 along the slide rail 91. The wiper 71 is mounted on and supported by the wiper carriage 92. The wiper 71 protrudes and extends upward from the wiper carriage 92.

The slide motor 93 is connected to the wiper carriage 92. Driving the slide motor 93 causes the wiper carriage 92 to move in the moving direction D1 along the slide rail 91. The movement of the wiper carriage 92 in the moving direction D1 moves the wiper 71 in the moving direction D1. Thus, the movement of the wiper 71 in the moving direction D1 allows the wiper 71 to reach a desired one of the wiping position P1, the removing position P2, and the applying position P3.

As illustrated in FIG. 2, the printer 10 includes a control device 110 (controller). The control device 110 (controller) is configured or programmed to perform processing related to printing and processing related to a cleaning process PR1 (see FIG. 12) to be performed on the ink heads 22. The control device 110 is not limited to any particular configuration. The control device 110 may include, for example, a microcomputer. The control device 110 may include, for example, an interface (I/F), a central processing unit (CPU), a read-only memory (ROM), and a random-access memory (RAM). The control device 110 is provided inside the case 11. Alternatively, the control device 110 may be implemented by, for example, a computer disposed outside the case 11. In this case, the control device 110 is connected to a control board (not illustrated) of the printer 10 so as to enable wire or wireless communication between the control device 110 and the control board of the printer 10.

As illustrated in FIG. 3, the control device 110 in the first example embodiment is communicably connected to: the ink heads 22; the light applicator 30 (or specifically, the light source 32); the head conveyor 51; the substrate conveyor 52; the raising/lowering unit 53; the capping device 60 (or specifically, the capper 62 and the suction pumps 63); the applier 73 (or specifically, the on-off valve 82 and the applying nozzle 83) of the wiping device 70; and the mover 74 (or specifically, the slide motor 93) of the wiping device 70. The control device 110 (controller) is configured or programmed to control the ink heads 22, the light applicator 30, the head conveyor 51, the substrate conveyor 52, the raising/lowering unit 53, the capper 62, the suction pumps 63, the applier 73, and the mover 74.

In the first example embodiment, the cleaning process PR1 (see FIG. 12) is performed on the ink heads 22 in order to reduce or prevent occurrence of abnormal discharge condition(s) in the nozzle(s) 24 of the ink head(s) 22. As used herein, the term "abnormal discharge condition(s) in the nozzle(s) 24" refers to any abnormality that results in a degradation in print quality, examples of which include misdirection of ink discharged from the nozzle(s) 24 and a nozzle failure that leads to a failure to discharge ink.

Figure 12:
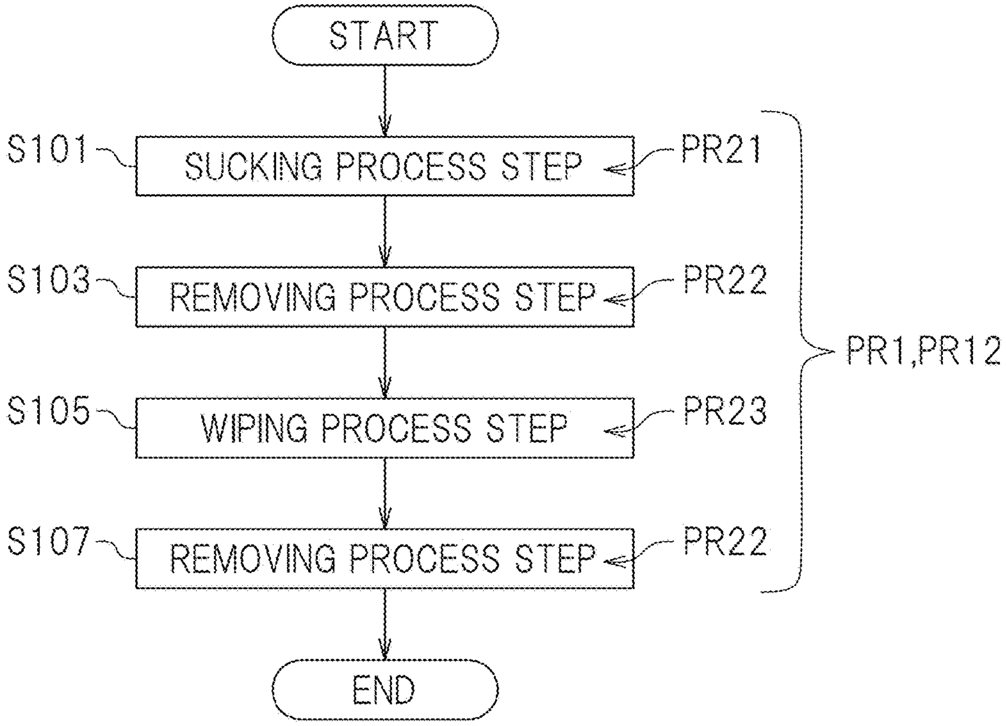
FIG. 12 is a flow chart illustrating a control procedure for a normal cleaning process.
Figure 13:
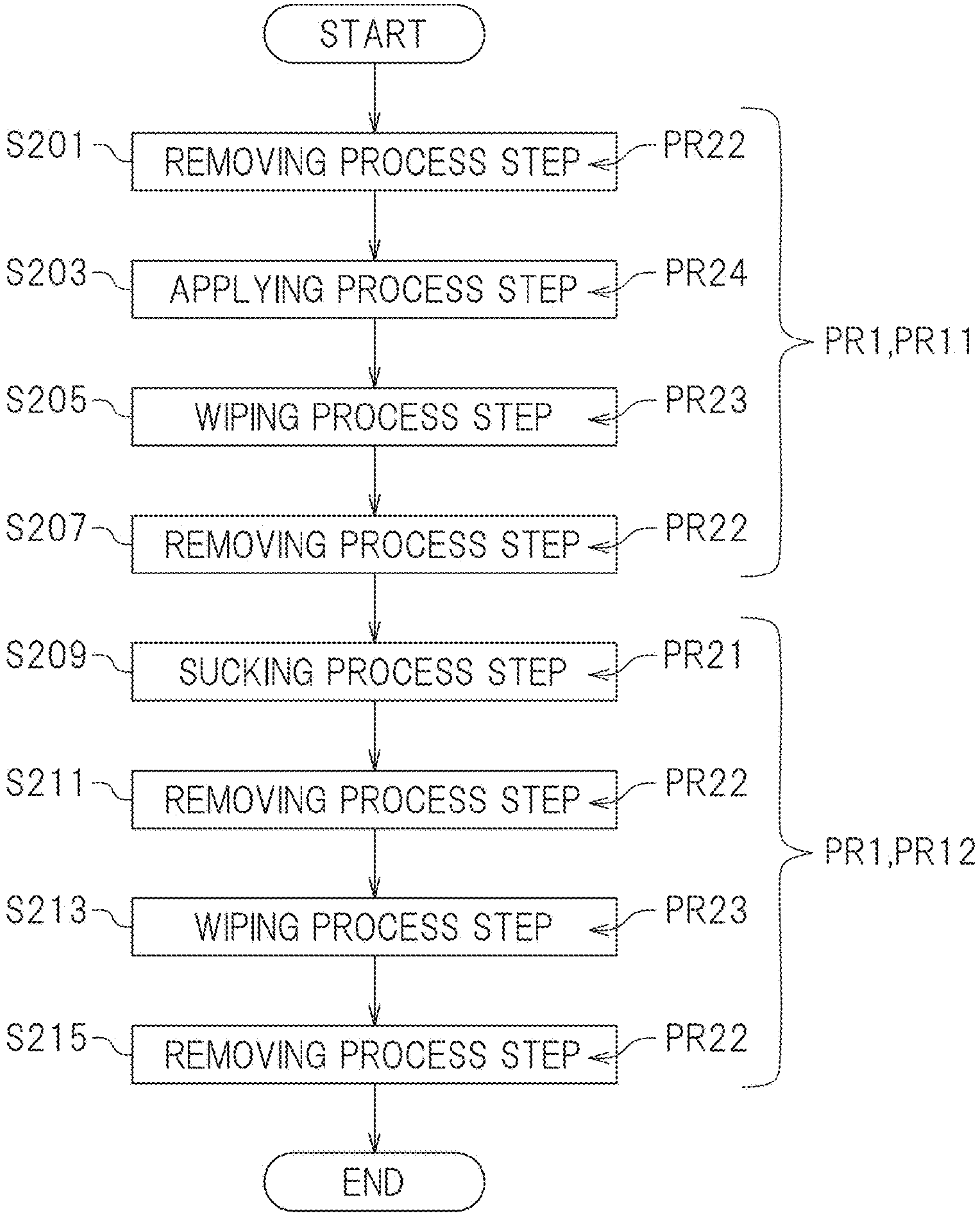
FIG. 13 is a flow chart illustrating a control procedure for a thorough cleaning process.

The cleaning process PR1 to be performed on the ink heads 22 may include a plurality of types of cleaning processes. In this example embodiment, the cleaning process PR1 includes a normal cleaning process PR12 (see FIG. 12) and a thorough cleaning process PR11 (see FIG. 13). FIG. 12 is a flow chart illustrating a control procedure for the normal cleaning process PR12. FIG. 13 is a flow chart illustrating a control procedure for the thorough cleaning process PR11. The normal cleaning process PR12 illustrated in FIG. 12 is performed on the ink heads 22 after end of printing. The normal cleaning process PR12 is an example of a second cleaning process. As used herein, the term "after end of printing" refers to, for example, a point in time when printing based on a piece of image data has finished after end of a print job. Image data is stored, for example, in an undermentioned memory 111 (see FIG. 3).

In the first example embodiment, ink may adhere to the nozzle surface(s) 23 of the ink head(s) 22. The ink adhering to the nozzle surface(s) 23 increases in viscosity with a lapse of time. Curing of the ink adhering to the nozzle surface(s) 23 is accelerated when the ink is exposed to light emitted from the light applicator 30 and reflected off the substrate 5 supported by the supporting table 40. The ink cured in this manner increases in viscosity and enters a semi-cured state. The semi-cured ink that has increased in viscosity will be referred to as "viscous ink". When the viscous ink keeps adhering to the nozzle surface(s) 23, abnormal discharge condition(s) in the nozzle(s) 24 is/are likely to occur. For example, wiping the nozzle surface(s) 23, with the viscous ink adhering to the nozzle surface(s) 23, causes the viscous ink to move to the nozzle(s) 24 or region(s) adjacent to the nozzle(s) 24. This may result in occurrence of abnormal discharge condition(s) in the nozzle(s) 24.

Specifically, effecting printing, with the viscous ink adhering to the nozzle surface(s) 23, further increases the viscosity of the viscous ink. This starts fixation of the viscous ink to the nozzle surface(s) 23, making it difficult to remove the viscous ink by wiping the nozzle surface(s) 23. In this case, new ink is likely to adhere to region(s) around the viscous ink fixed to the nozzle surface(s) 23. Because the new ink is also hard to remove and keeps adhering to the nozzle surface(s) 23, the new ink increases in viscosity with a lapse of time. This results in start of fixation of the new viscous ink to the nozzle surface(s) 23, which accumulates the viscous ink and makes it likely that abnormal discharge condition(s) in the nozzle(s) 24 will occur. If the viscous ink enters the nozzle(s) 24 and cannot be discharged out of the nozzle (s) 24 by, for example, the cleaning process PR1, the ink head(s) 22 will be replaced. Accordingly, the ink adhering to the nozzle surface(s) 23 is preferably removed.

The thorough cleaning process PR11 is performed on the ink heads 22 in order to remove the viscous ink adhering to the nozzle surface(s) 23. In the first example embodiment, the thorough cleaning process PR11 is an example of a first cleaning process.

In the first example embodiment, the thorough cleaning process PR11 is performed when a cumulative printing time is equal to or longer than a predetermined reference time during printing standby. As used herein, the term "cumulative printing time" refers to a sum of printing times after the previous thorough cleaning process PR11 has been performed. In this example embodiment, the cumulative printing time is reset upon execution of the thorough cleaning process PR11. The reference time is not limited to any particular length of time but is set suitably in accordance with the type of the printer 10. The reference time is in the range of six hours to ten hours, and is preferably in the range of seven hours to nine hours. In one example, the reference time is eight hours. The reference time is stored in advance in, for example, the memory 111 (see FIG. 3).

As illustrated in FIG. 3, the control device 110 in the first example embodiment includes the memory 111, a first cleaning executor 120, and a second cleaning executor 130 in order to perform the cleaning process PR1. The control device 110 is configured or programmed to cause the first cleaning executor 120 and the second cleaning executor 130 to perform their functions. The memory 111, the first cleaning executor 120, and the second cleaning executor 130 may be implemented by software or hardware. In one example, the memory 111, the first cleaning executor 120, and the second cleaning executor 130 may each be implemented by one or more processors or may each be incorporated into a circuit.

The first cleaning executor 120 is configured or programmed to perform the thorough cleaning process PR11 illustrated in FIG. 13. In this example embodiment, the first cleaning executor 120 is configured or programmed to include a first prior removal controller 121, an application controller 123, a first wiping controller 125, and a first subsequent removal controller 127. The first cleaning executor 120 is configured or programmed to cause the first prior removal controller 121, the application controller 123, the first wiping controller 125, and the first subsequent removal controller 127 to perform their functions. The thorough cleaning process PR11 is performed as a result of control sequentially exercised by the first prior removal controller 121, the application controller 123, the first wiping controller 125, and the first subsequent removal controller 127. The control exercised for the thorough cleaning process PR11 will be described in detail below.

The second cleaning executor 130 illustrated in FIG. 3 is configured or programmed to perform the normal cleaning process PR12 illustrated in FIG. 12. In this example embodiment, the second cleaning executor 130 is configured or programmed to include a suction controller 131, a second prior removal controller 133, a second wiping controller 135, and a second subsequent removal controller 137. The second cleaning executor 130 is configured or programmed to cause the suction controller 131, the second prior removal controller 133, the second wiping controller 135, and the second subsequent removal controller 137 to perform their functions. The normal cleaning process PR12 is performed as a result of control sequentially exercised by the suction controller 131, the second prior removal controller 133, the second wiping controller 135, and the second subsequent removal controller 137.

The control procedure for the normal cleaning process PR12 will be described below with reference to the flow chart of FIG. 12.

The normal cleaning process PR12 first involves performing step S101. In step S101, the suction controller 131 illustrated in FIG. 3 performs a sucking process step PR21. The sucking process step PR21 performed by the suction controller 131 involves exercising control such that the caps 61 are attached to the ink heads 22 as illustrated in FIG. 6 and then the suction pumps 63 are driven. Specifically, the suction controller 131 controls the capper 62 such that the caps 61 are attached to the ink heads 22 so as to cover the nozzles 24 (see FIG. 4) with the caps 61. The suction pumps 63 are driven after the caps 61 have been attached to the ink heads 22.

Upon driving the suction pumps 63, ink inside the ink heads 22 is discharged (or sucked) out of the nozzles 24 into the caps 61, and the ink inside the caps 61 is discharged through the tubes 64 into the waste fluid tank (not illustrated).

In step S103 of FIG. 12, the second prior removal controller 133 illustrated in FIG. 3 performs a removing process step PR22 after the control for the sucking process step PR21 has been exercised by the suction controller 131. The removing process step PR22 performed by the second prior removal controller 133 involves exercising control such that the remover 72 comes into contact with the wiper 71 at the removing position P2 as illustrated in FIG. 10. Specifically, the second prior removal controller 133 controls the mover 74 such that the wiper 71 moves to the removing position P2.

In one example, the second prior removal controller 133 first moves the wiper 71 such that the wiper 71 is located rearward of the remover 72 as illustrated in FIG. 8. The second prior removal controller 133 then moves the wiper 71 forward in the moving direction D1 such that the wiper 71 reaches the removing position P2. This brings the extremity of the wiper 71 into contact with a lower portion of the remover 72 as illustrated in FIG. 10. With the extremity of the wiper 71 in contact with the remover 72, further forward movement of the wiper 71 bends the wiper 71. An attachment (such as ink) adhering to the extremity of the wiper 71 thus adheres to the remover 72, so that the attachment is removed from the wiper 71. As used herein, the term "removed" not only refers to a situation where an entirety of an attachment adhering to the wiper 71 is removed but also refers to a situation where a portion of an attachment adhering to the wiper 71 is removed in a predetermined amount.

In step S105 of FIG. 12, the second wiping controller 135 illustrated in FIG. 3 performs a wiping process step PR23 after the control for the removing process step PR22 has been exercised by the second prior removal controller 133. The wiping process step PR23 performed by the second wiping controller 135 involves exercising control such that the nozzle surfaces 23 are wiped with the wiper 71 at the wiping position P1 as illustrated in FIG. 9.

Specifically, the second prior removal controller 133 controls the head conveyor 51 such that a targeted one of the ink heads 22 (i.e., a rightmost one of the ink heads 22 in FIG. 7), which is to be wiped with the wiper 71, moves to the wiping position P1 as illustrated in FIG. 7. The nozzle surface 23 of the target ink head 22 to be wiped with the wiper 71 is thus located directly above the slide rail 91 of the mover 74.

The second wiping controller 135 subsequently controls the mover 74 such that the wiper 71 located at the removing position P2 (see FIG. 10) moves to the wiping position P1 (see FIG. 9). In the course of forward movement of the wiper 71 from the removing position P2 to the wiping position P1 in the moving direction D1, the wiper 71 passes through the applying position P3. In the normal cleaning process PR12, however, the applier 73 does not apply the cleaning fluid 85 to the wiper 71 at the applying position P3, with the result that the wiper 71 has no cleaning fluid 85 thereon. Accordingly, the wiper 71 has no cleaning fluid 85 thereon when having reached the wiping position P1, and the second wiping controller 135 thus performs the wiping process step PR23 by using the wiper 71 having no cleaning fluid 85 thereon.

The second wiping controller 135 then moves the wiper 71, which has reached the wiping position P1, further forward as illustrated in FIG. 9. The extremity of the wiper 71 is thus brought into contact with the nozzle surface 23 of the target ink head 22 while being bent. With the wiper 71 in contact with the nozzle surface 23 of the target ink head 22, forward movement of the wiper 71 wipes off an attachment (such as ink) adhering to the nozzle surface 23 of the target ink head 22. The number of times the wiper 71 moves in the moving direction D1 during the wiping process step PR23 is not limited to once but may be twice or more.

In step S107 of FIG. 12, the second subsequent removal controller 137 illustrated in FIG. 3 performs the removing process step PR22. After the control for the wiping process step PR23 has been exercised by the second wiping controller 135, the second subsequent removal controller 137 brings the remover 72 into contact with the wiper 71 at the removing position P2 as illustrated in FIG. 10. The second subsequent removal controller 137 controls the mover 74 such that the wiper 71 located at the wiping position P1 (see FIG. 9) moves to the removing position P2 (see FIG. 10). Similarly to the removing process step PR22 (see step S103) performed by the second prior removal controller 133, the extremity of the wiper 71 comes into contact with the lower portion of the remover 72 at the removing position P2. With the extremity of the wiper 71 in contact with the remover 72, further movement of the wiper 71 in the moving direction D1 bends the wiper 71. In step S107, the wiper 71 bends in a direction opposite to that in which the wiper 71 has bent in step S103 (see FIG. 10). Thus, an attachment (such as ink) adhering to the extremity of the wiper 71 adheres to the remover 72 and is removed from the wiper 71.

After the removing process step PR22 of step S107 (see FIG. 12) has been performed in the above-described manner, the wiping process step PR23 of step S105 is performed on the other ink heads 22 (i.e., the ink heads 22 that have not yet undergone wiping) and the removing process step PR22 of step S107 is subsequently performed on the wiper 71.

The control procedure for the thorough cleaning process PR11 to be performed by the first cleaning executor 120 (see FIG. 3) will be described below with reference to the flow chart of FIG. 13.

In step S201, the first prior removal controller 121 illustrated in FIG. 3 performs the removing process step PR22. The removing process step PR22 performed by the first prior removal controller 121 involves exercising control such that the wiper 71 comes into contact with the remover 72 at the removing position P2 as illustrated in FIG. 10. The control for the removing process step PR22 exercised by the first prior removal controller 121 is similar to the control for the removing process step PR22 (step S103 of FIG. 12) exercised by the second prior removal controller 133 and will thus not be described in detail. In step S201, the first prior removal controller 121 moves the wiper 71 in the moving direction D1 such that the extremity of the wiper 71 comes into contact with the remover 72 so as to remove an attachment (such as ink) adhering to the wiper 71.

In step S203 of FIG. 13, the application controller 123 illustrated in FIG. 3 performs an applying process step PR24. After the control for the removing process step PR22 has been exercised by the first prior removal controller 121, the application controller 123 performs the applying process step PR24 involving causing the applier 73 to apply the cleaning fluid 85 to the wiper 71 at the applying position P3 as illustrated in FIG. 11. Specifically, the application controller 123 controls the mover 74 such that the wiper 71 located at the removing position P2 (see FIG. 10) moves to the applying position P3 (see FIG. 11). At the applying position P3, the wiper 71 is located directly below the applying nozzle 83 of the applier 73.

The application controller 123 subsequently opens the on-off valve 82 of the applier 73 such that the cleaning fluid 85 stored in the container 81 is supplied through the supply passage 84 to the applying nozzle 83. The application controller 123 then causes the applying nozzle 83 to discharge the cleaning fluid 85 onto the wiper 71. Thus, the wiper 71, or in particular, the extremity of the wiper 71 has the cleaning fluid 85 applied thereto. During application of the cleaning fluid 85 to the wiper 71 from the applier 73, the wiper 71 may move in the moving direction D1 or may be stationary.

In step S205 of FIG. 13, the first wiping controller 125 illustrated in FIG. 3 performs the wiping process step PR23 after the control for the applying process step PR24 has been exercised by the application controller 123. The wiping process step PR23 performed by the first wiping controller 125 involves exercising control such that the nozzle surface 23 of the target ink head 22 is wiped with the wiper 71 at the wiping position P1 as illustrated in FIG. 9. Similarly to the wiping process step PR23 (see step S105 of FIG. 12) performed by the second wiping controller 135, the first wiping controller 125 controls the head conveyor 51 such that a targeted one of the ink heads 22, which is to be wiped with the wiper 71, moves to the wiping position P1 as illustrated in FIG. 7. The nozzle surface 23 of the target ink head 22 to be wiped with the wiper 71 is thus located directly above the slide rail 91 of the mover 74.

Unlike the wiping process step PR23 (see step S105 of FIG. 12) performed by the second wiping controller 135, the wiping process step PR23 performed by the first wiping controller 125 involves using the wiper 71 having the cleaning fluid 85 thereon.

The first wiping controller 125 controls the mover 74 such that the wiper 71 located at the applying position P3 (see FIG. 11) moves to the wiping position P1 (see FIG. 9). The first wiping controller 125 then moves the wiper 71, which has reached the wiping position P1, further forward. This brings the extremity of the wiper 71 into contact with the nozzle surface 23 of the target ink head 22. With the wiper 71 in contact with the nozzle surface 23 of the target ink head 22, forward movement of the wiper 71 wipes off an attachment (such as viscous ink) adhering to the nozzle surface 23 of the target ink head 22. The number of times the wiper 71 moves in the moving direction D1 during the wiping process step PR23 performed by the first wiping controller 125 is not limited to once but may be twice or more.

In step S207 of FIG. 13, the first subsequent removal controller 127 illustrated in FIG. 3 performs the removing process step PR22. After the control for the wiping process step PR23 has been exercised by the first wiping controller 125, the first subsequent removal controller 127 brings the wiper 71 into contact with the remover 72 at the removing position P2 as illustrated in FIG. 10. The control for the removing process step PR22 exercised by the first subsequent removal controller 127 is similar to the control for the removing process step PR22 (see step S107 of FIG. 12) exercised by the second subsequent removal controller 137 and will thus not be described in detail. In step S207, the first subsequent removal controller 127 moves the wiper 71 in the moving direction D1 such that the extremity of the wiper 71 comes into contact with the remover 72 so as to remove an attachment (such as viscous ink) adhering to the wiper 71.

After the removing process step PR22 of step S207 (see FIG. 13) has been performed in the above-described manner, the wiping process step PR23 of step S205 is performed on the other ink heads 22 (i.e., the ink heads 22 that have not yet undergone wiping) and the removing process step PR22 of step S207 is subsequently performed on the wiper 71. The thorough cleaning process PR11 is performed by following the steps just described.

In the first example embodiment, the wiping process step PR23 of step S205 is performed on all of the ink heads 22, and the removing process step PR22 of step S207 is performed on the wiper 71 each time the wiping process step PR23 of step S205 is performed. Accordingly, the normal cleaning process PR12 is performed as illustrated in FIG. 13 after the wiping process step PR23 of step S205 has been performed on the last ink head 22 and then the removing process step PR22 of step S207 has been performed on the wiper 71. In step S209 of FIG. 13, the suction controller 131 illustrated in FIG. 3 exercises control for the sucking process step PR21 similarly to step S101 of FIG. 12. In step S211 of FIG. 13, the second prior removal controller 133 illustrated in FIG. 3 performs the removing process step PR22 similarly to step S103 of FIG. 12. In step S213 of FIG. 13, the second wiping controller 135 illustrated in FIG. 3 performs the wiping process step PR23 similarly to step S105 of FIG. 12. In step S215 of FIG. 13, the second subsequent removal controller 137 illustrated in FIG. 3 performs the removing process step PR22 similarly to step S107 of FIG. 12.

As illustrated in FIG. 8, the printer 10 in the first example embodiment includes the ink heads 22, the wiper 71, the remover 72, the applier 73, the mover 74, and the control device 110 (see FIG. 2). As illustrated in FIG. 4, the ink heads 22 include the nozzle surfaces 23 provided with the nozzles 24 to discharge ink. As illustrated in FIG. 9, the wiper 71 wipes the nozzle surface 23 of the target ink head 22 at the wiping position P1. As illustrated in FIG. 10, the wiper 71 is brought into contact with the remover 72 at the removing position P2 such that the remover 72 removes an attachment adhering to the wiper 71. As illustrated in FIG. 11, the applier 73 applies the cleaning fluid 85 to the wiper 71 at the applying position P3. As illustrated in FIG. 9, the mover 74 moves the wiper 71 and the target ink head 22 relative to each other such that the wiper 71 and the target ink head 22 are located at the wiping position P1. As illustrated in FIG. 10, the mover 74 moves the wiper 71 and the remover 72 relative to each other such that the wiper 71 and the remover 72 are located at the removing position P2. As illustrated in FIG. 11, the mover 74 moves the wiper 71 and the applier 73 relative to each other such that the wiper 71 and the applier 73 are located at the applying position P3.

As illustrated in FIG. 3, the control device 110 includes the first cleaning executor 120 configured or programmed to execute the thorough cleaning process PR11 (see FIG. 13). The first cleaning executor 120 includes the first prior removal controller 121, the application controller 123, and the first wiping controller 125. The first prior removal controller 121 exercises control such that the wiper 71 is brought into contact with the remover 72 at the removing position P2 as illustrated in FIG. 10. After the control has been exercised by the first prior removal controller 121, the application controller 123 exercises control such that the applier 73 applies the cleaning fluid 85 to the wiper 71 at the applying position P3 as illustrated in FIG. 11. After the control has been exercised by the application controller 123, the first wiping controller 125 exercises control such that the nozzle surface 23 of the target ink head 22 is wiped with the wiper 71 at the wiping position P1 as illustrated in FIG. 9.

In the first example embodiment, the thorough cleaning process PR11 illustrated in FIG. 13 involves causing the applier 73 to apply the cleaning fluid 85 to the wiper 71 from which an attachment has been removed with the remover 72. Because the nozzle surface 23 of the target ink head 22 is wiped with the wiper 71 having the cleaning fluid 85 applied thereto, the cleaning fluid 85 applied to the wiper 71 sticks to, for example, viscous ink adhering to the nozzle surface 23 of the target ink head 22. This facilitates removing the viscous ink from the nozzle surface 23 of the target ink head 22 with the cleaning fluid 85. Accordingly, the printer 10 according to the first example embodiment is able to successfully remove the viscous ink adhering to the nozzle surface 23 of the target ink head 22 because the cleaning fluid 85 applied to the wiper 71 sticks to the viscous ink.

In the first example embodiment, the wiping position P1, the removing position P2, and the applying position P3 are in alignment with each other in the predetermined moving direction D1 as illustrated in FIG. 7. The mover 74 is configured to move the wiper 71 in the moving direction D1. Because the wiping position P1, the removing position P2, and the applying position P3 are in alignment with each other in the moving direction D1 as just mentioned, what is required is to exercise control for linear movement of the wiper 71. Accordingly, the first example embodiment is able to prevent control for movement of the wiper 71 from being complicated.

In the first example embodiment, the removing position P2, the applying position P3, and the wiping position P1 are located in this order in the moving direction D1. During the thorough cleaning process PR11 illustrated in FIG. 13, the wiper 71 moves to the removing position P2, the applying position P3, and the wiping position P1 in this order. Thus, the wiping position P1, the removing position P2, and the applying position P3 are located in the moving direction D1 in the order in which the wiper 71 moves during the thorough cleaning process PR11. This makes it possible to reduce the distance travelled by the wiper 71 during execution of the thorough cleaning process PR11. Consequently, the first example embodiment is able to reduce the time required for execution of the thorough cleaning process PR11.

As illustrated in FIG. 8, the mover 74 in the first example embodiment includes: the slide rail 91 extending in the moving direction D1; the wiper carriage 92 which is in slidable engagement with the slide rail 91 and on which the wiper 71 is mounted; and the slide motor 93 connected to the wiper carriage 92 and configured to move the wiper carriage 92 in the moving direction D1. Thus, simply moving the wiper carriage 92 along the slide rail 91 enables movement of the wiper 71 in the moving direction D1.

As illustrated in FIG. 11, the applier 73 in the first example embodiment includes: the container 81 storing the cleaning fluid 85; the supply passage 84 whose first end is connected to the container 81; the openable and closable on-off valve 82 provided at a location somewhere along the supply passage 84; and the applying nozzle 83 connected to the second end of the supply passage 84 and configured to discharge the cleaning fluid 85 onto the wiper 71. Thus, opening and closing the on-off valve 82 makes it possible to allow and stop discharge of the cleaning fluid 85 from the applying nozzle 83. Accordingly, the applier 73 is able to apply the cleaning fluid 85 to the wiper 71 only when necessary.

In the first example embodiment, the first cleaning executor 120 includes the first subsequent removal controller 127 (see FIG. 3) configured or programmed to bring the wiper 71 into contact with the remover 72 at the removing position P2 after the control for the wiping process step PR23 (see step S205 of FIG. 13) has been exercised by the first wiping controller 125. Upon execution of the wiping process step PR23 by the first wiping controller 125, ink adheres to the wiper 71. Because the ink adhering to the wiper 71 is cured with a lapse of time, the ink adhering to the wiper 71 is preferably removed as soon as possible. Accordingly, the first example embodiment involves execution of the removing process step PR22 (see step S207 of FIG. 13) by the first subsequent removal controller 127 after the wiping process step PR23. Consequently, the first example embodiment facilitates removal of the ink adhering to the wiper 71.

In the first example embodiment, the printer 10 includes the capping device 60 as illustrated in FIGS. 5 and 6. The capping device 60 includes: the caps 61 attachable to the ink heads 22 such that the nozzles 24 are covered with the caps 61; the capper 62 to attach and detach the caps 61 to and from the ink heads 22; and the suction pumps 63 connected to the caps 61.

As illustrated in FIG. 3, the control device 110 includes the second cleaning executor 130 configured or programmed to execute the normal cleaning process PR12 (see FIG. 12). The second cleaning executor 130 includes the suction controller 131, the second prior removal controller 133, the second wiping controller 135, and the second subsequent removal controller 137. The suction controller 131 exercises control such that the caps 61 are attached to the ink heads 22 as illustrated in FIG. 6 and then the suction pumps 63 are driven. After the control has been exercised by the suction controller 131, the second prior removal controller 133 exercises control such that the wiper 71 comes into contact with the remover 72 at the removing position P2 as illustrated in FIG. 10. After the control has been exercised by the second prior removal controller 133, the second wiping controller 135 exercises control such that the nozzle surface 23 of the target ink head 22 is wiped with the wiper 71 at the wiping position P1 as illustrated in FIG. 9. After the control has been exercised by the second wiping controller 135, the second subsequent removal controller 137 exercises control such that the wiper 71 comes into contact with the remover 72 at the removing position P2 as illustrated in FIG. 10. The second wiping controller 135 exercises control such that the nozzle surface 23 of the target ink head 22 is wiped with the wiper 71 having no cleaning fluid 85 applied thereto.

When viscous ink, for example, is adhering to the nozzle surface(s) 23, the thorough cleaning process PR11 illustrated in FIG. 13 is performed. When ink that is not as cured as viscous ink is adhering to the nozzle surface(s) 23, however, the ink would be wiped off with the wiper 71 if no cleaning fluid 85 is applied to the wiper 71. Accordingly, when ink that is not as cured as viscous ink is adhering to the nozzle surface(s) 23, the normal cleaning process PR12 is performed as illustrated in FIG. 12, making it possible to reduce the consumption of the cleaning fluid 85.

In the first example embodiment, the second cleaning executor 130 is configured or programmed to, after end of printing, execute the normal cleaning process PR12 as illustrated in FIG. 12. Ink adhering to the nozzle surface (s) 23 after end of printing is ink that has adhered to the nozzle surface(s) 23, for example, during printing and that is not as cured as viscous ink. Thus, performing the normal cleaning process PR12 after end of printing makes it possible to remove ink adhering to the nozzle surface(s) 23 without applying the cleaning fluid 85 to the wiper 71.

In the first example embodiment, the second cleaning executor 130 is configured or programmed to execute the normal cleaning process PR12 after the first cleaning executor 120 has executed the thorough cleaning process PR11 as illustrated in FIG. 13. The thorough cleaning process PR11 involves wiping each nozzle surface 23 with the wiper 71 having the cleaning fluid 85 applied thereto. This may cause the cleaning fluid 85 to adhere to the nozzle surface(s) 23. The cleaning fluid 85 that has adhered to the nozzle surface (s) 23 may enter the nozzle(s) 24. To cope with this, the first example embodiment involves performing the normal cleaning process PR12 after the thorough cleaning process PR11, so that the cleaning fluid 85 would be discharged out of the nozzle(s) 24 by the sucking process step PR21 of step S209 (see FIG. 13) if the cleaning fluid 85 has entered the nozzle(s) 24. In addition, performing the wiping process step PR23 (see step S213 of FIG. 13) included in the normal cleaning process PR12 makes it possible to remove the cleaning fluid 85 adhering to the nozzle surface(s) 23.

In the first example embodiment, the first cleaning executor 120 is configured or programmed to execute the thorough cleaning process PR11 when a cumulative printing time that has elapsed since previous execution of the thorough cleaning process PR11 is equal to or longer than a predetermined reference time. For example, ink that has adhered to the nozzle surface(s) 23 is semi-cured and becomes viscous ink when a certain period of time (e.g., the reference time) has elapsed since printing. When the cumulative printing time is equal to or longer than the reference time, ink adhering to the nozzle surface(s) 23 may have become viscous ink. Thus, performing the thorough cleaning process PR11 when ink adhering to the nozzle surface(s) 23 may have just become viscous ink enables efficient execution of the thorough cleaning process PR11.

Alternatively, the thorough cleaning process PR1*l* may be performed at a time other than when the cumulative printing time is equal to or longer than the reference time. In one example, the thorough cleaning process PR1*l* may be performed in a time period (e.g., nighttime) during which no printing is performed by the user using the printer 10. The thorough cleaning process PR1*l* may be performed, for example, once daily in a time period during which no printing is performed using the printer 10.

In the first example embodiment, the moving direction D1 corresponds to the sub-scanning direction X. The moving direction D1, however, may correspond to any other suitable direction. The moving direction D1 may correspond to, for example, the main scanning direction Y.

In the first example embodiment, the removing position P2, the applying position P3, and the wiping position P1 are located in this order from the rear to the front in the moving direction D1. The wiping position P1, the removing position P2, and the applying position P3, however, may be located in any other suitable order. In one example, the removing position P2, the applying position P3, and the wiping position P1 may be located in this order from the front to the rear. In another example, the wiping position P1 may be located between the removing position P2 and the applying position P3.

In the first example embodiment, the wiping position P1, the removing position P2, and the applying position P3 are each fixed, and the mover 74 moves the wiper 71 to the wiping position P1, the removing position P2, and the applying position P3. Alternatively, the position of the wiper 71 may be fixed, and the mover 74 may move the ink heads 22, the remover 72, and the applier 73. The position of the wiper 71 after the ink heads 22 have been moved toward the wiper 71 by the mover 74 may be the wiping position P1. The position of the wiper 71 after the remover 72 has been moved toward the wiper 71 by the mover 74 may be the removing position P2. The position of the wiper 71 after the applier 73 has been moved toward the wiper 71 by the mover 74 may be the applying position P3. In this example, the wiping position P1, the removing position P2, and the applying position P3 are located at the same position, and each correspond to the fixed position of the wiper 71.

The above description has discussed the case where the wiper 71 is moved toward the ink heads 22, the remover 72, and the applier 73, and the case where the ink heads 22, the remover 72, and the applier 73 are moved toward the wiper 71. Alternatively, either the wiper 71 or the ink heads 22 may be moved to the wiping position P1, or the wiper 71 and the ink heads 22 may both be moved to the wiping position P1. Either the wiper 71 or the remover 72 may be moved to the removing position P2, or the wiper 71 and the remover 72 may both be moved to the removing position P2. Either the wiper 71 or the applier 73 may be moved to the applying position P3, or the wiper 71 and the applier 73 may both be moved to the applying position P3. Which of the wiper 71 and the ink heads 22 should be moved to the wiping position P1, which of the wiper 71 and the remover 72 should be moved to the removing position P2, and which of the wiper 71 and the applier 73 should be moved to the applying position P3 may each be determined as desired. The wiping position P1, the removing position P2, and the applying position P3 may be located at the same position. Any two of the wiping position P1, the removing position P2, and the applying position P3 may be located at the same position. The wiping position P1, the removing position P2, and the applying position P3 may be located at different positions.

In the first example embodiment, the wiping process step PR23 involves causing the mover 74 to move the wiper 71 in the moving direction D1 so as to wipe each nozzle surface 23 with the wiper 71 at the wiping position P1. Alternatively, the head conveyor 51, for example, may move the ink heads 22 in the main scanning direction Y without movement of the wiper 71 so as to wipe each nozzle surface 23 with the wiper 71 at the wiping position P1. Optionally, the wiper 71 and the ink heads 22 may both be moved so as to wipe each nozzle surface 23 with the wiper 71 at the wiping position P1.

In the first example embodiment, the removing process step PR22 involves causing the mover 74 to move the wiper 71 such that the wiper 71 comes into contact with the remover 72 at the removing position P2 so as to remove an attachment adhering to the wiper 71. Alternatively, the remover 72 may be moved toward the wiper 71. The remover 72 may be moved without movement of wiper 71 such that the remover 72 comes into contact with the wiper 71 at the removing position P2. The wiper 71 and the remover 72 may both be moved such that the wiper 71 and the remover 72 come into contact with each other at the removing position P2.

In the first example embodiment, the applying process step PR24 involves causing the mover 74 to move the wiper 71 such that the wiper 71 is located directly below the applying nozzle 83 so as to apply the cleaning fluid 85 to the wiper 71 at the applying position P3. Alternatively, the applying nozzle 83 of the applier 73 may be moved toward the wiper 71. The applying nozzle 83 of the applier 73 may be moved without movement of the wiper 71 such that the wiper 71 is located directly below the applying nozzle 83 so as to apply the cleaning fluid 85 to the wiper 71 at the applying position P3. The wiper 71 and the applying nozzle 83 of the applier 73 may both be moved such that the wiper 71 is located directly below the applying nozzle 83 so as to apply the cleaning fluid 85 to the wiper 71 at the applying position P3.

In the first example embodiment, the remover 72 is the absorber to absorb a liquid such as ink. Alternatively, the remover 72 may be a "scraper". The scraper may be a plate member made of a material harder than that of the wiper 71. The scraper may be, for example, a plastic plate member. If the remover 72 is such a scraper, the wiper 71 would come into contact with the scraper so as to remove an attachment (such as ink) adhering to the wiper 71.

Second Example Embodiment

A printer 10A according to a second example embodiment of the present invention will now be described. Components of the printer 10A according to the second example embodiment similar to those of the printer 10 according to the first example embodiment are identified by the same reference signs and will not be described when deemed redundant. Components of the printer 10A according to the second example embodiment similar in function to but different in configuration, structure, or arrangement from those of the printer 10 according to the first example embodiment are given the same names and identified by different reference signs when necessary.

Figure 14:
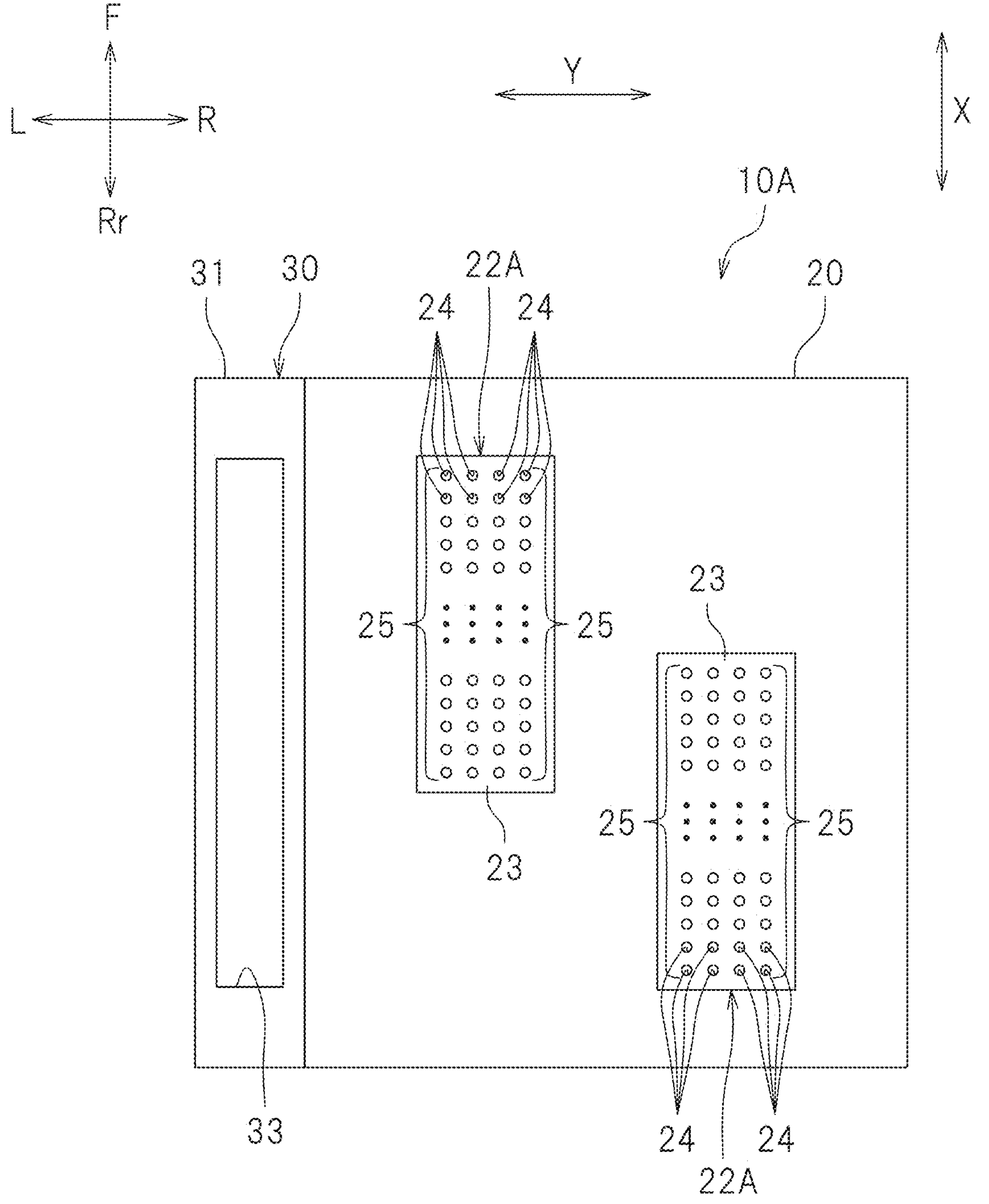
FIG. 14 is a bottom view of a carriage, ink heads, and a light applicator of a printer according to a second example embodiment of the present invention.
Figure 15:
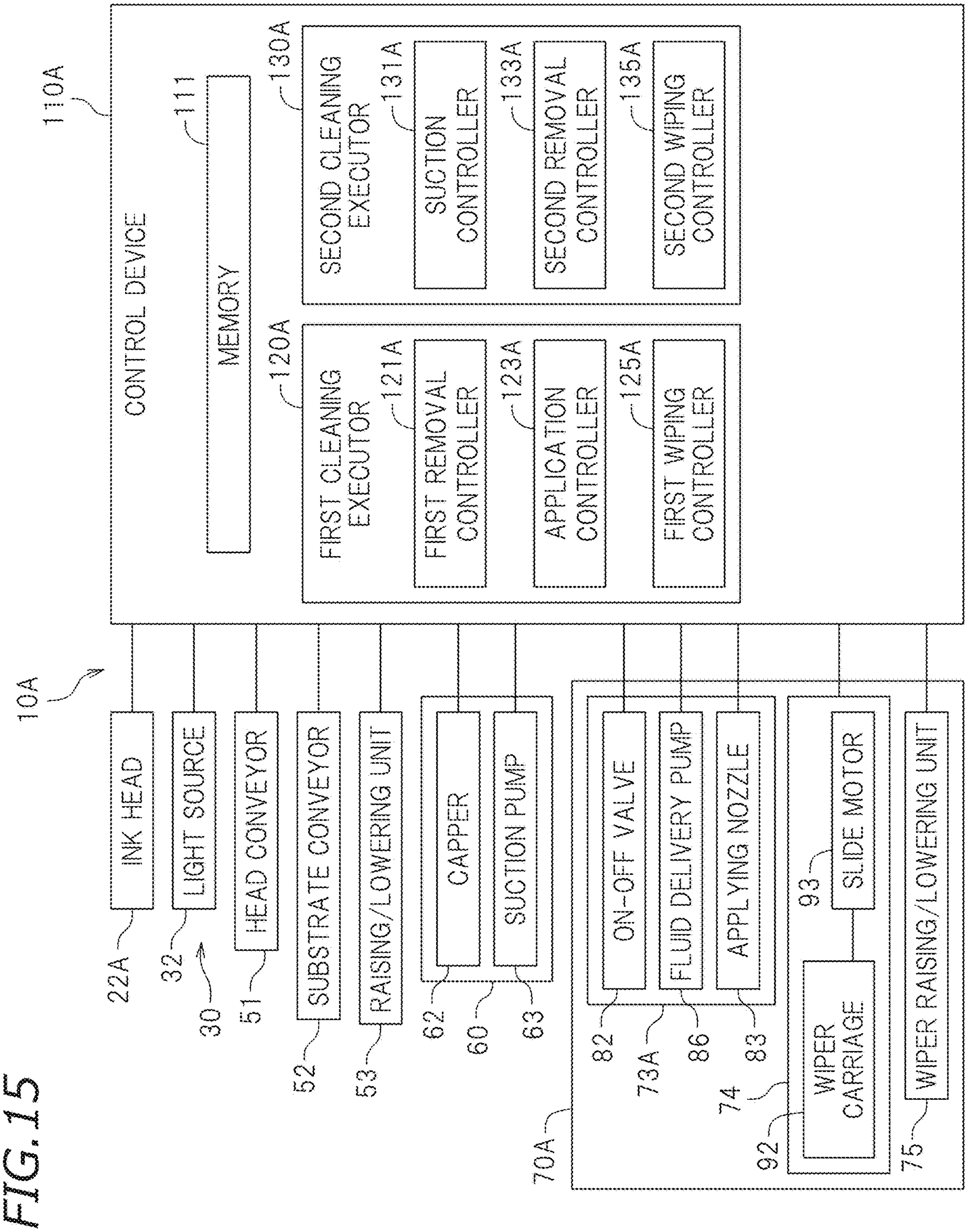
FIG. 15 is a block diagram of the printer according to the second example embodiment of the present invention.

FIG. 14 is a bottom view of a carriage 20, ink heads 22A, and a light applicator 30 of the printer 10A according to the second example embodiment. FIG. 15 a block diagram of the printer 10A. In the second example embodiment, the printer 10A includes the carriage 20, the ink heads 22A, and the light applicator 30 as illustrated in FIG. 14. The ink heads 22A discharge ink onto a substrate 5 (see FIG. 2) supported by a supporting table 40 (see FIG. 2). The ink heads 22A are mounted on the carriage 20. The ink heads 22A are movable in a main scanning direction Y together with the carriage 20.

In the second example embodiment, the number of ink heads 22A is two, for example. The two ink heads 22A are arranged in the main scanning direction Y but are disposed at different positions in a sub-scanning direction X. The two ink heads 22A are disposed in a "staggered arrangement". At least a portion of the left ink head 22A is located forward of the right ink head 22A. In the second example embodiment, the two ink heads 22A include overlapping portions in the sub-scanning direction X, and a portion of one of the ink heads 22A is located forward of the other ink head 22A in the sub-scanning direction X. Alternatively, the two ink heads 22A may include no overlapping portions in the sub-scanning direction X, and an entirety of one of the ink heads 22A may be located forward of the other ink head 22A in the sub-scanning direction X. The ink heads 22A each include a nozzle surface 23 provided with nozzles 24. In the second example embodiment, each of the ink heads 22A includes four nozzle rows 25 in each of which the nozzles 24 are in alignment with each other in the sub-scanning direction X.

Figure 16:
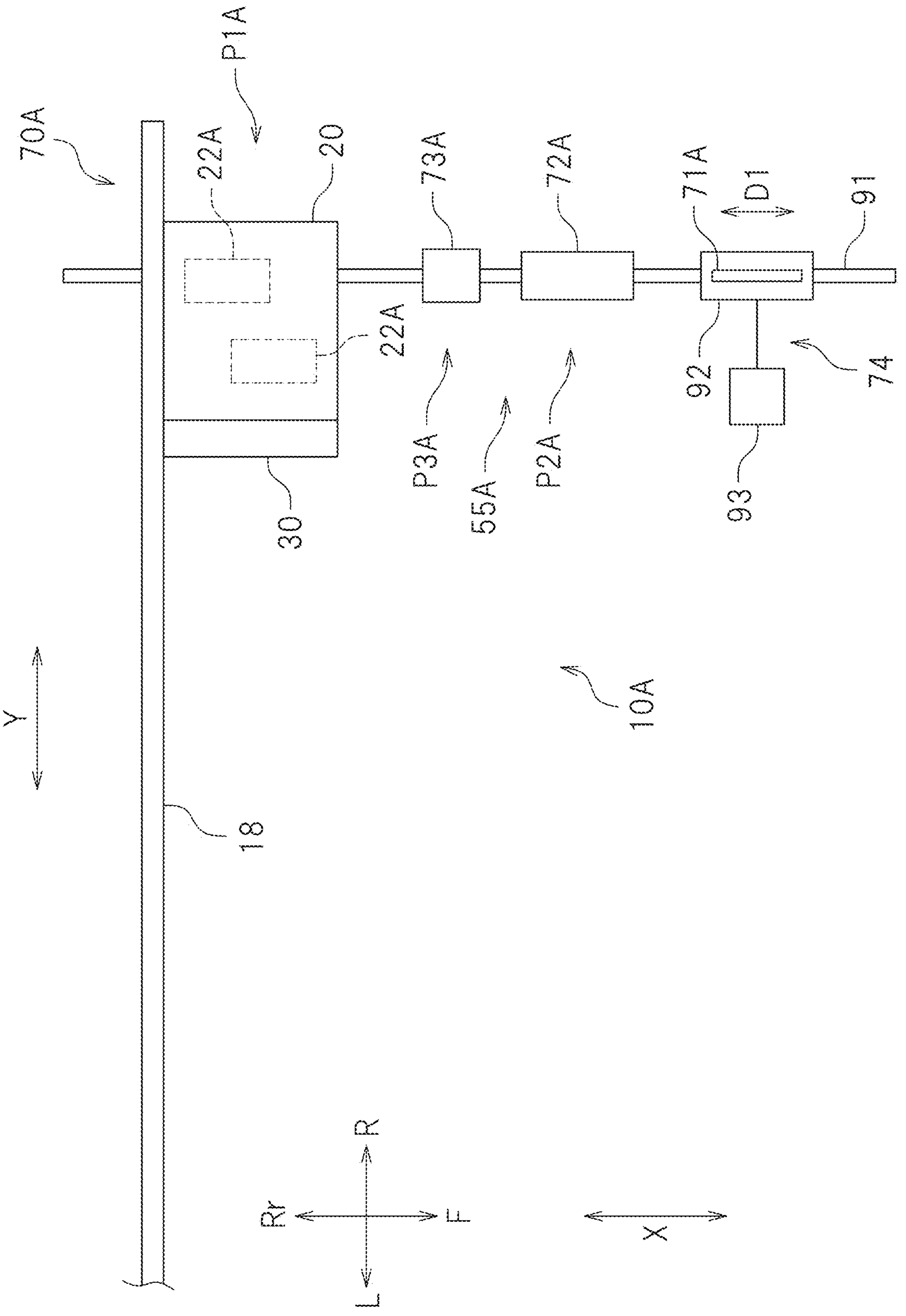
FIG. 16 is a schematic plan view of the carriage and a wiping device according to the second example embodiment of the present invention.
Figure 17:
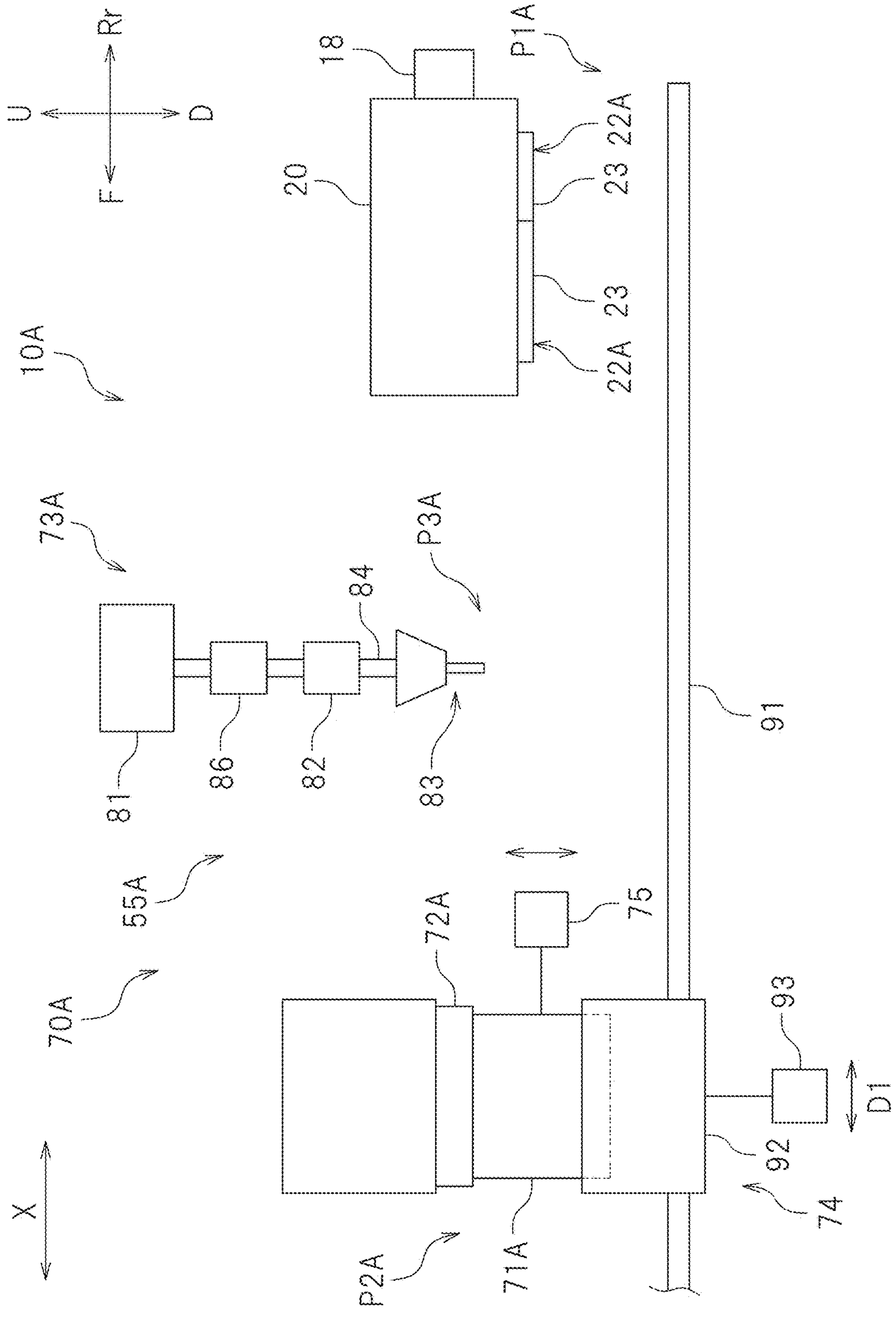
FIG. 17 is a schematic right side view of the carriage and the wiping device according to the second example embodiment of the present invention, with its wiper located at a removing position.
Figure 18:
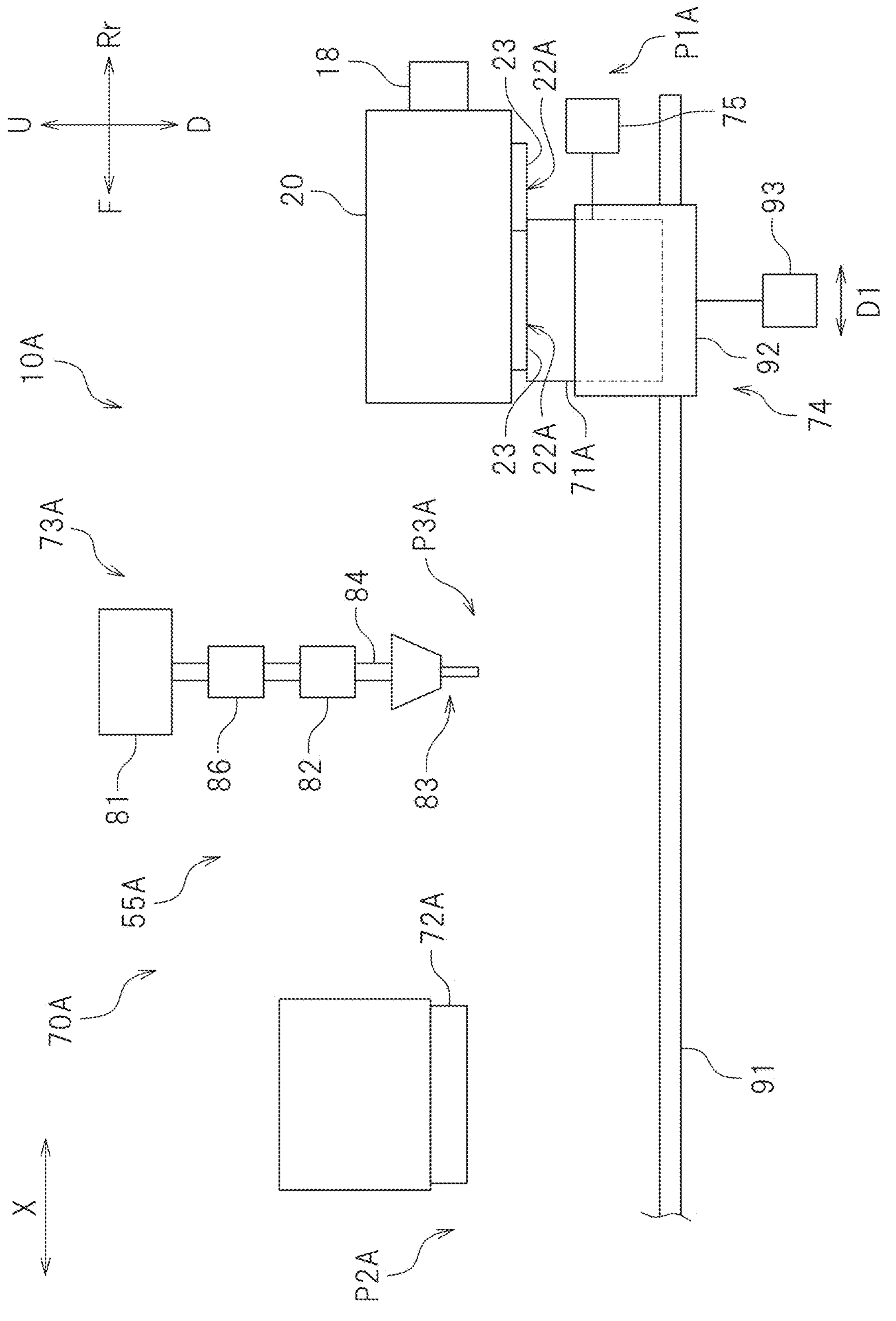
FIG. 18 is a schematic right side view of the carriage and the wiping device according to the second example embodiment of the present invention, with its wiper located at a wiping position.
Figure 19:
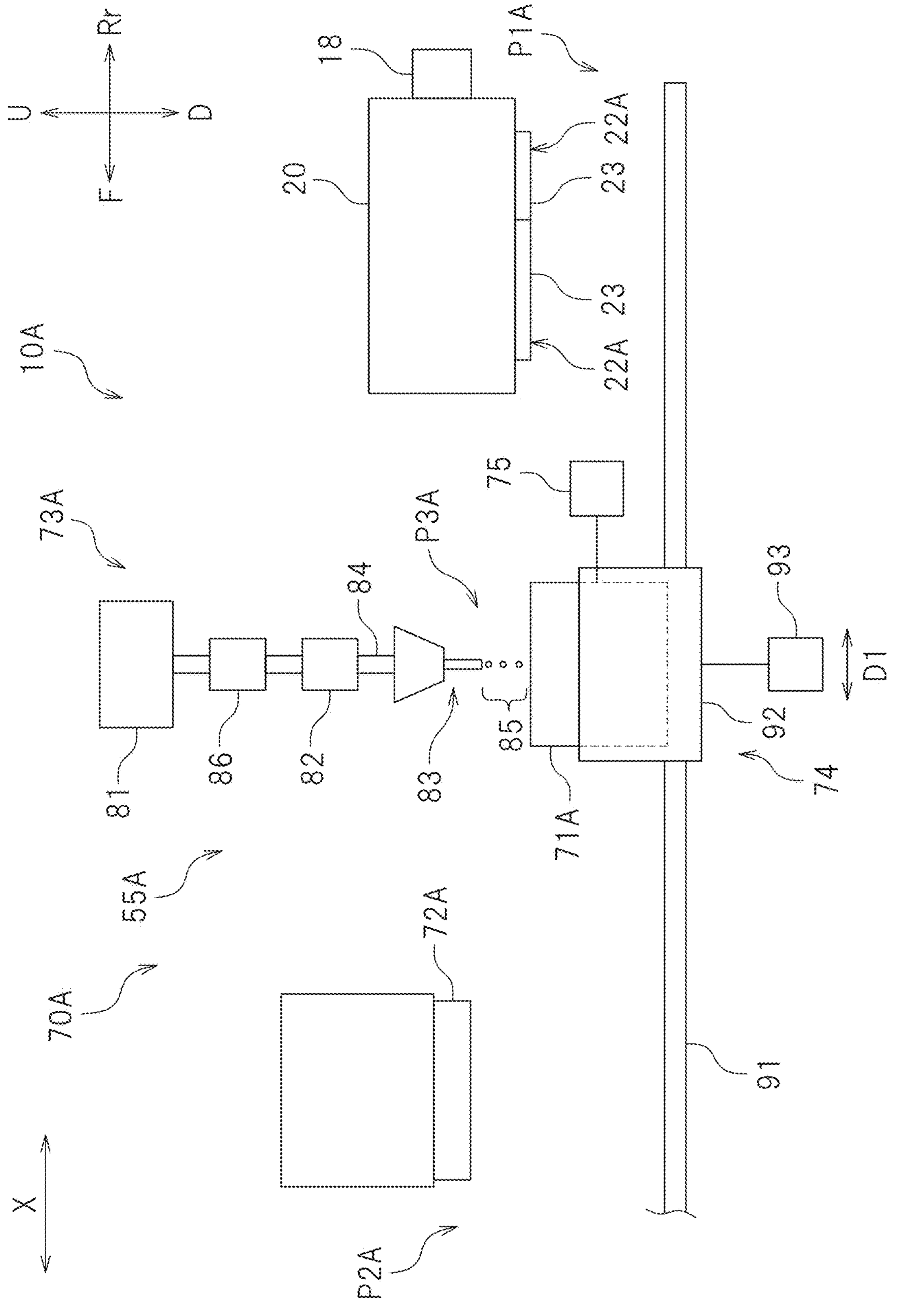
FIG. 19 is a schematic right side view of the carriage and the wiping device according to the second example embodiment of the present invention, with its wiper located at an applying position.

FIG. 16 is a schematic plan view of the carriage 20 and a wiping device 70A. FIGS. 17 to 19 are schematic right side views of the carriage 20 and the wiping device 70A. In the second example embodiment, the printer 10A includes a cleaning unit 55A as illustrated in FIG. 16. The cleaning unit 55A includes a capping device 60 (see FIG. 15) and the wiping device 70A. The capping device 60 according to the second example embodiment is similar in arrangement to the capping device 60 (see FIG. 5) according to the first example embodiment except that the number of caps 61 included in the capping device 60 according to the second example embodiment is two, which corresponds to the number of ink heads 22A.

As illustrated in FIG. 18, the wiping device 70A wipes the nozzle surfaces 23 of the ink heads 22A. The wiping device 70A is disposed around a home position where the ink heads 22A are put on standby during non-printing mode. The wiping device 70A includes a wiper 71A, a remover 72A, an applier 73A, and a mover 74.

The wiper 71A is a member to wipe the nozzle surfaces 23 of the ink heads 22A. In the second example embodiment, the wiper 71A is a plate member extending in the sub-scanning direction X and an up-down direction. A length of the wiper 71A in the sub-scanning direction X is equal to or longer than a length of each nozzle surface 23 in the sub-scanning direction X. The number of wipers 71A is one. The wiping device 70A is able to sequentially wipe the nozzle surfaces 23 of the two ink heads 22A with one wiper 71A.

In the second example embodiment, the wiper 71A is disposed such that an extremity of the wiper 71A (i.e., an upper end of the wiper 71A in this example embodiment) is located at the same height as or slightly above the nozzle surfaces 23. In this state, the ink heads 22A are moved in the main scanning direction Y. The ink heads 22A thus reach a position directly above the wiper 71A such that the nozzle surface(s) 23 come(s) into contact with the wiper 71A. With the nozzle surface(s) 23 in contact with the wiper 71A, the ink heads 22A further move in the main scanning direction Y, so that the nozzle surfaces 23 of the two ink heads 22A are sequentially wiped with the wiper 71A.

In the second example embodiment the wiping device 70A includes a wiper raising/lowering unit 75 as illustrated in FIG. 17. The wiper raising/lowering unit 75 raises and lowers the wiper 71A. FIG. 17 illustrates the wiper 71A in a raised position. The wiper raising/lowering unit 75 is not limited to any particular configuration, structure, or arrangement. Although not illustrated, the wiper raising/lowering unit 75 includes, for example, a gear mechanism including gears and a drive motor to rotate the gears. Driving the drive motor, for example, raises and lowers the wiper 71A through the gears.

In the second example embodiment, the remover 72A extends in the sub-scanning direction X. A length of the remover 72A in the sub-scanning direction X is equal to or longer than a length of the wiper 71A in the sub-scanning direction X. The remover 72A is made of a porous material. The remover 72A is, for example, an absorber. Examples of the absorber includes a sponge. With the wiper 71A located directly below the remover 72A, driving the wiper raising/lowering unit 75 raises the wiper 71A such that the wiper 71A moves toward the remover 72A. This brings the extremity of the wiper 71A into contact with the remover 72A, so that an attachment (such as ink) adhering to the extremity of the wiper 71A adheres to the remover 72A and is thus removed from the extremity of the wiper 71A. After the extremity of the wiper 71A has come into contact with the remover 72A, the wiper 71A is lowered by the wiper raising/lowering unit 75 and moved away from the remover 72A.

As illustrated in FIG. 19, the applier 73A includes a container 81, an on-off valve 82, an applying nozzle 83, and a supply passage 84 similarly to the applier 73 according to the first example embodiment (see FIG. 11). The applier 73A further includes a fluid delivery pump 86. Activating the fluid delivery pump 86 allows the cleaning fluid 85 stored in the container 81 to flow toward the applying nozzle 83. The fluid delivery pump 86 promotes supply of the cleaning fluid 85, which is stored in the container 81, to the applying nozzle 83. The fluid delivery pump 86 is provided on the supply passage 84. In the second example embodiment, the fluid delivery pump 86 is provided at a location somewhere along the supply passage 84 and closer to the container 81 than the on-off valve 82. The fluid delivery pump 86 may be any type of pump. The fluid delivery pump 86 is, for example, a tube pump.

When applying no cleaning fluid 85 to the wiper 71A, the second example embodiment involves closing the on-off valve 82 and deactivating the fluid delivery pump 86. In this case, the cleaning fluid 85 stored in the container 81 is not supplied to the applying nozzle 83. When applying the cleaning fluid 85 to the wiper 71A, the second example embodiment involves opening the on-off valve 82 and activating the fluid delivery pump 86. In this case, the cleaning fluid 85 stored in the container 81 is supplied to the applying nozzle 83 through the supply passage 84. Because the fluid delivery pump 86 is provided as mentioned above, activating the fluid delivery pump 86 when the cleaning fluid 85 is to be discharged from the applying nozzle 83 allows the cleaning fluid 85 stored in the container 81 to flow smoothly to the applying nozzle 83. The cleaning fluid 85 is thus more reliably discharged from the applying nozzle 83. If the cleaning fluid 85 stored in the container 81 in the form of a pouch is running low, activating the fluid delivery pump 86 would enable the cleaning fluid 85 to flow to the applying nozzle 83. This reduces the amount of the cleaning fluid 85 left unused in the container 81.

Similarly to the first example embodiment, the second example embodiment involves setting: a wiping position PlA (see FIG. 18) where the wiper 71A wipes the nozzle surfaces 23 of the ink heads 22A; a removing position P2A (see FIG. 17) where an attachment adhering to the wiper 71A is removed with the remover 72A; and an applying position P3A (see FIG. 19) where the applier 73A applies the cleaning fluid 85 to the wiper 71A. The wiping position PlA is an example of the first position. The removing position P2A is an example of the second position. The applying position P3A is an example of the third position. As illustrated in FIG. 16, the wiping position PlA, the removing position P2A, and the applying position P3A are located in a line in a moving direction D1 in a plan view. The wiping position PlA, the removing position P2A, and the applying position P3A are in alignment with each other in the sub-scanning direction X. In the second example embodiment, the wiping position PlA, the applying position P3A, and the removing position P2A are located in this order from the rear to the front. The applying position P3A is located in front of the wiping position PlA. The removing position P2A is located in front of the applying position P3A.

As illustrated in FIG. 15, the printer 10A according to the second example embodiment includes a control device 110A (controller). The control device 110A (controller) is communicably connected to: the ink heads 22A; the light applicator 30 (or specifically, a light source 32); a head conveyor 51; a substrate conveyor 52; a raising/lowering unit 53; the capping device 60 (or specifically, a capper 62 and suction pumps 63); the applier 73A (or specifically, the on-off valve 82, the applying nozzle 83, and the fluid delivery pump 86) of the wiping device 70A; the mover 74 (or specifically, a slide motor 93) of the wiping device 70A; and the wiper raising/lowering unit 75 of the wiping device 70A. The control device 110A controls the ink heads 22A, the light applicator 30, the head conveyor 51, the substrate conveyor 52, the raising/lowering unit 53, the capper 62, the suction pumps 63, the applier 73A, the mover 74, and the wiper raising/lowering unit 75.

The control device 110A (controller) includes a memory 111, a first cleaning executor 120A, and a second cleaning executor 130A. The control device 110A (controller) is configured or programmed to cause the first cleaning executor 120A and the second cleaning executor 130A to perform their functions. The first cleaning executor 120A is configured or programmed to include a first removal controller 121A, an application controller 123A, and a first wiping controller 125A. The first cleaning executor 120A is configured or programmed to cause the first removal controller 121A, the application controller 123A, and the first wiping controller 125A to perform their functions. The second cleaning executor 130A includes a suction controller 131A, a second removal controller 133A, and a second wiping controller 135A. The second cleaning executor 130A is configured or programmed to cause the suction controller 131A, the second removal controller 133A, and the second wiping controller 135A to perform their functions. Each component of the control device 110A (controller) may be implemented by software or hardware. Each component of the control device 110A (controller) may be implemented by one or more processors or may be incorporated into a circuit.

Figure 20:
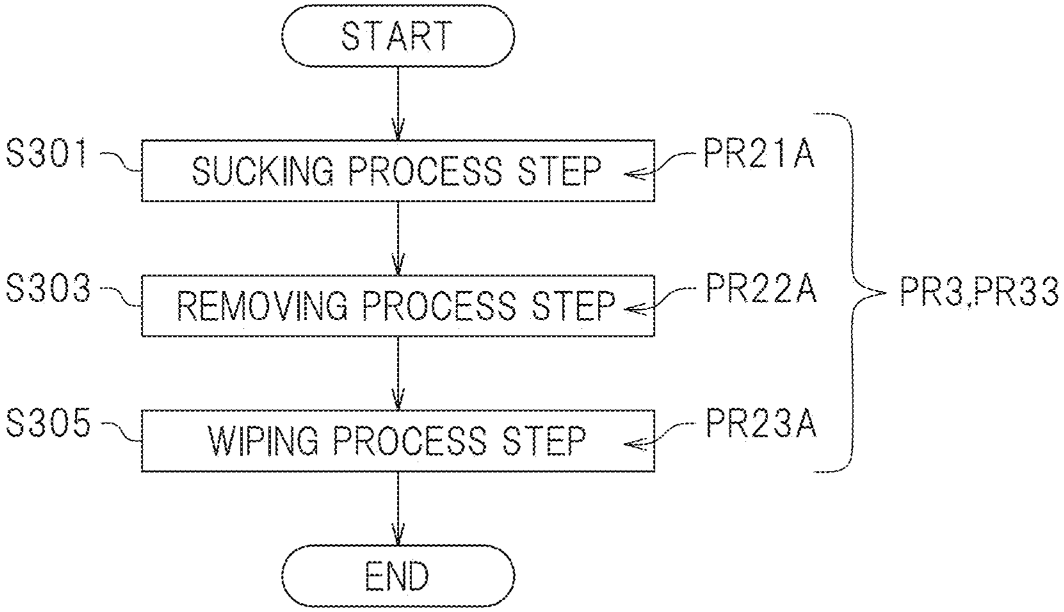
FIG. 20 is a flow chart illustrating a control procedure for a first normal cleaning process.
Figure 21:
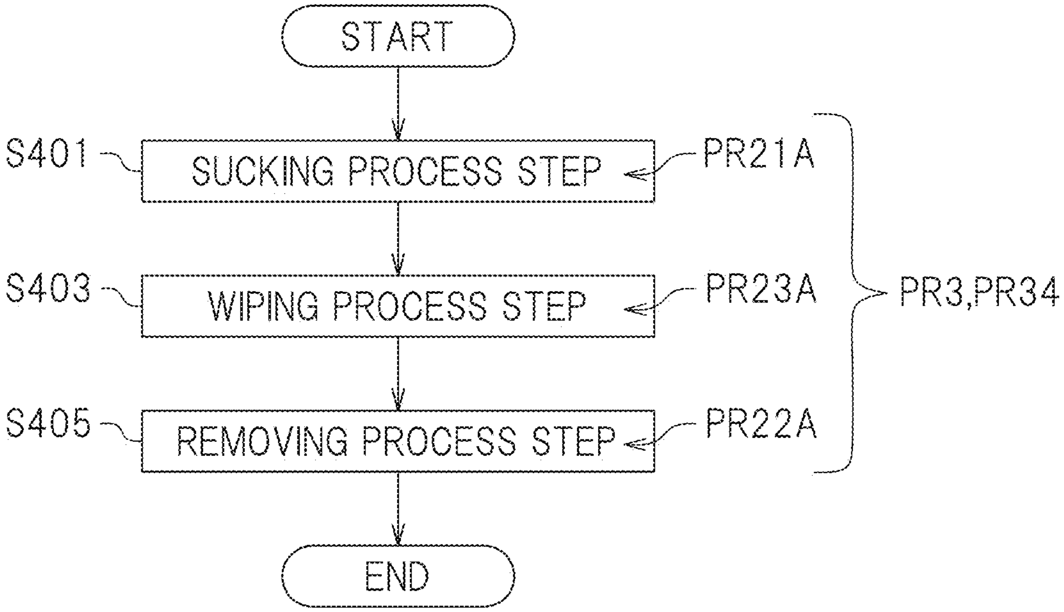
FIG. 21 is a flow chart illustrating a control procedure for a second normal cleaning process.
Figure 22:
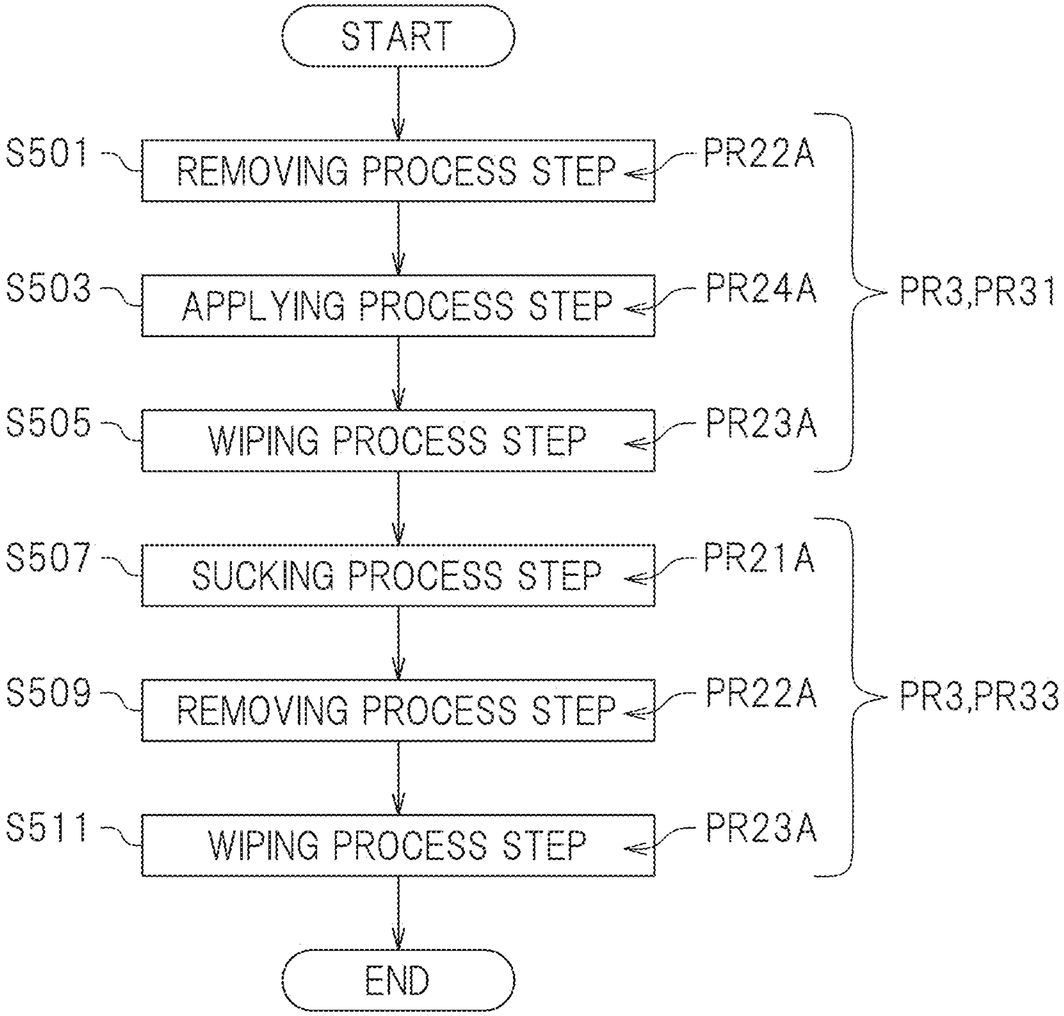
FIG. 22 is a flow chart illustrating a control procedure for a first thorough cleaning process.
Figure 23:
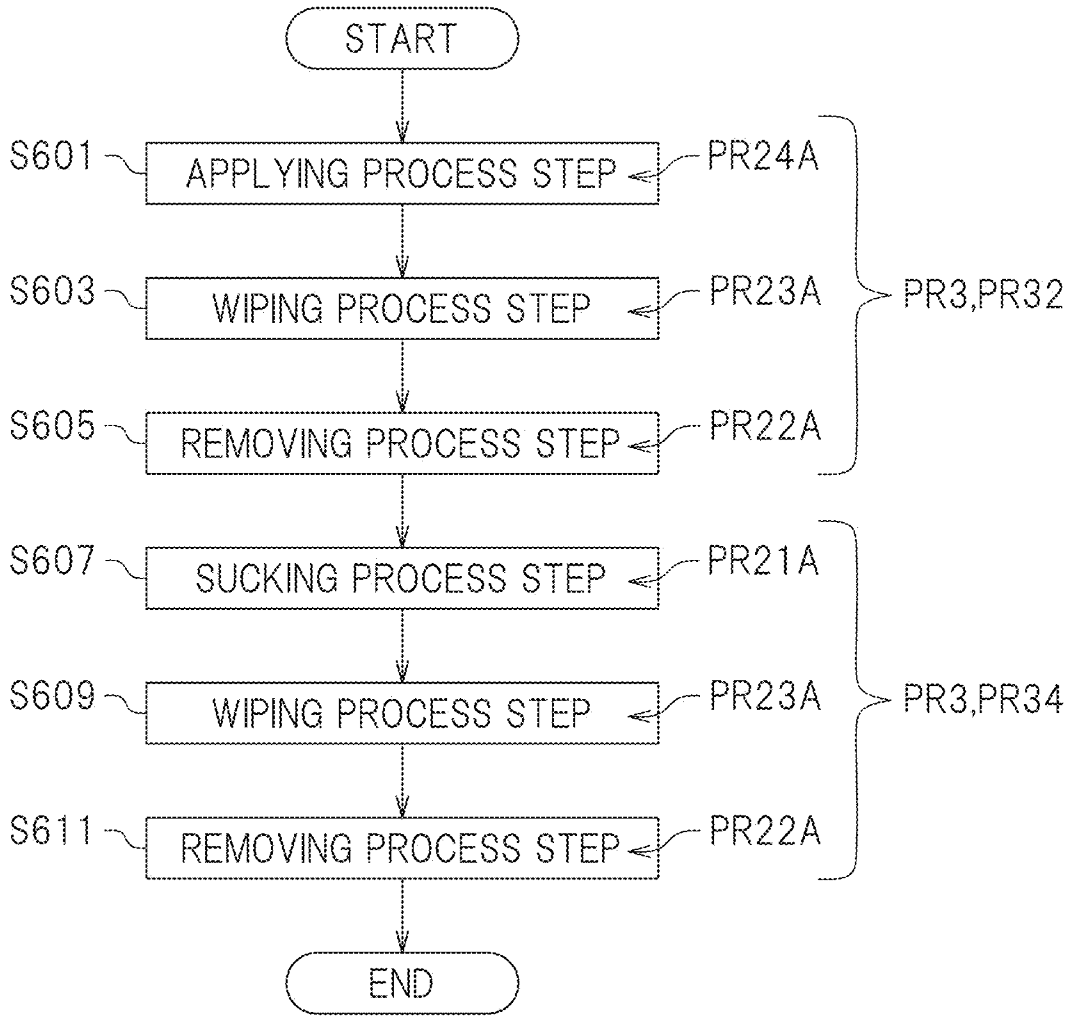
FIG. 23 is a flow chart illustrating a control procedure for a second thorough cleaning process.

FIGS. 20 to 23 are flow charts illustrating control procedures for a cleaning process PR3 according to the second example embodiment. FIG. 20 is a flow chart illustrating a control procedure for a first normal cleaning process PR33. FIG. 21 is a flow chart illustrating a control procedure for a second normal cleaning process PR34. FIG. 22 is a flow chart illustrating a control procedure for a first thorough cleaning process PR31. FIG. 23 is a flow chart illustrating a control procedure for a second thorough cleaning process PR32. In the second example embodiment, the cleaning process PR3 is performed on the ink heads 22A in order to reduce or prevent occurrence of abnormal discharge condition(s) in the nozzle(s) 24 of the ink head(s) 22A.

The cleaning process PR3 includes the first thorough cleaning process PR31 (see FIG. 22), the second thorough cleaning process PR32 (see FIG. 23), the first normal cleaning process PR33 (see FIG. 20), and the second normal cleaning process PR34 (see FIG. 21). Each of the first normal cleaning process PR33 and the second normal cleaning process PR34 is an example of the second cleaning process. The second cleaning executor 130A illustrated in FIG. 15 is configured or programmed to be able to execute the first normal cleaning process PR33 and the second normal cleaning process PR34. The second cleaning executor 130A is configured or programmed to execute either the first normal cleaning process PR33 or the second normal cleaning process PR34 after end of printing.

Each of the first thorough cleaning process PR31 and the second thorough cleaning process PR32 is an example of the first cleaning process. The first cleaning executor 120A illustrated in FIG. 15 is configured or programmed to be able to execute the first thorough cleaning process PR31 and the second thorough cleaning process PR32. The first cleaning executor 120A is configured or programmed to execute either the first thorough cleaning process PR31 or the second thorough cleaning process PR32 when a cumulative printing time is equal to or longer than a predetermined reference time during printing standby.

The following description discusses the first normal cleaning process PR33 and the second normal cleaning process PR34. Although described in detail below, the timing of performing a removing process step PR22A differs between the first normal cleaning process PR33 and the second normal cleaning process PR34.

The first normal cleaning process PR33 first involves performing step S301 of FIG. 20. In step S301, the suction controller 131A illustrated in FIG. 15 performs a sucking process step PR21A. The sucking process step PR21A is similar to the sucking process step PR21 (see FIG. 12) according to the first example embodiment. The suction controller 131A controls the capper 62 such that the caps 61 (see FIG. 6) are attached to the ink heads 22A. With the caps 61 attached to the ink heads 22A, the suction controller 131A then activates the suction pumps 63 (see FIG. 6) so as to discharge ink from the ink heads 22A into the caps 61.

In step S303 of FIG. 20, the second removal controller 133A illustrated in FIG. 15 performs the removing process step PR22A. After the control for the sucking process step PR21 has been exercised by the suction controller 131A, the second removal controller 133A performs the removing process step PR22A involving bringing the wiper 71A into contact with the remover 72A at the removing position P2A as illustrated in FIG. 17.

In step S303, the second removal controller 133A controls the mover 74 such that the wiper 71A moves to the removing position P2A. In one example, the second removal controller 133A moves the wiper 71A such that the wiper 71A is located directly below the remover 72A as illustrated in FIG. 17, or in other words, such that the wiper 71A overlaps with the remover 72A in a plan view.

With the wiper 71A located at the removing position P2A, the second removal controller 133A controls the wiper raising/lowering unit 75 such that the wiper 71A is raised toward the remover 72A. Upon raising of the wiper 71A, the extremity of the wiper 71A comes into contact with a bottom surface of the remover 72A. As a result of this contact, an attachment adhering to the extremity of the wiper 71A adheres to the remover 72A and is thus removed from the wiper 71A. After the extremity of the wiper 71A has come into contact with the remover 72A, the second removal controller 133A controls the wiper raising/lowering unit 75 such that the wiper 71A moves away from the remover 72A (i.e., such that the wiper 71A is lowered).

In step S305 of FIG. 20, the second wiping controller 135A illustrated in FIG. 15 performs a wiping process step PR23A after the control for the removing process step PR22A has been exercised by the second removal controller 133A. The second wiping controller 135A performs the wiping process step PR23A involving exercising control such that each nozzle surface 23 is wiped with the wiper 71A at the wiping position PlA as illustrated in FIG. 18. The second wiping controller 135A exercises control such that each nozzle surface 23 is wiped with the wiper 71A having no cleaning fluid 85 applied thereto. In step S305, the second wiping controller 135A controls the mover 74 such that the wiper 71A moves to the wiping position PlA. The wiper 71A moves rearward to the wiping position PlA. Thus, with the wiper 71A located at the wiping position PlA, the second wiping controller 135A controls the head conveyor 51 (see FIG. 15) such that the ink heads 22A move toward the wiper 71A in the main scanning direction Y. Accordingly, upon arrival of the ink heads 22A at the wiping position PlA, the extremity of the wiper 71A comes into contact with the nozzle surface 23 of the target ink head 22A. With the wiper 71A in contact with the nozzle surface 23 of the target ink head 22A, further movement of the ink heads 22A in the main scanning direction Y causes the wiper 71A to wipe off an attachment (such as ink) adhering to the nozzle surface 23 of the target ink head 22A. The first normal cleaning process PR33 is performed by following the steps just described.

The second normal cleaning process PR34 will now be described. The second normal cleaning process PR34 first involves performing step S401 of FIG. 21. In step S401, the suction controller 131A illustrated in FIG. 15 performs the sucking process step PR21A similar to the sucking process step PR21A of the first normal cleaning process PR33. The second normal cleaning process PR34 then involves performing step S403 of FIG. 21. In step S403, the second wiping controller 135A illustrated in FIG. 15 performs the wiping process step PR23A before execution of the removing process step PR22A. After the control for the sucking process step PR21A has been exercised by the suction controller 131A, the second wiping controller 135A exercises control such that each nozzle surface 23 is wiped with the wiper 71A at the wiping position PlA as illustrated in FIG. 18.

In step S405 of FIG. 21, the second removal controller 133A illustrated in FIG. 15 performs the removing process step PR22A after the wiping process step PR23A has finished. After the control for the wiping process step PR23A has been exercised by the second wiping controller 135A, the second removal controller 133A exercises control such that the wiper 71A comes into contact with the remover 72A at the removing position P2A as illustrated in FIG. 17. Thus, the second normal cleaning process PR34 differs from the first normal cleaning process PR33 in that the second normal cleaning process PR34 involves performing the removing process step PR22A after the wiping process step PR23A.

The following description discusses the first thorough cleaning process PR31 and the second thorough cleaning process PR32. Although described in detail below, the timing of performing the removing process step PR22A differs between the first thorough cleaning process PR31 and the second thorough cleaning process PR32.

The first thorough cleaning process PR31 first involves performing step S501 of FIG. 22. In step S501, the first removal controller 121A illustrated in FIG. 15 performs the removing process step PR22A. The first removal controller 121A performs the removing process step PR22A involving exercising control such that the wiper 71A comes into contact with the remover 72A at the removing position P2A as illustrated in FIG. 17. The control for the removing process step PR22A exercised by the first removal controller 121A is similar to the control for the removing process step PR22A exercised by the second removal controller 133A illustrated in FIG. 15.

In step S503 of FIG. 22, the application controller 123A illustrated in FIG. 15 performs an applying process step PR24A. The application controller 123A performs the applying process step PR24A involving causing the applier 73A to apply the cleaning fluid 85 to the wiper 71A at the applying position P3A as illustrated in FIG. 19. In step S503, the application controller 123A controls the mover 74 such that the wiper 71A moves to the applying position P3A. The application controller 123A subsequently opens the on-off valve 82 of the applier 73A and activates the fluid delivery pump 86. This enables the cleaning fluid 85, which is stored in the container 81, to be supplied to the applying nozzle 83 through the supply passage 84. The application controller 123A then causes the applying nozzle 83 to discharge the cleaning fluid 85 onto the wiper 71A. Thus, the wiper 71A, or in particular, the extremity of the wiper 71A has the cleaning fluid 85 applied thereto.

In step S505 of FIG. 22, the first wiping controller 125A illustrated in FIG. 15 performs the wiping process step PR23A. In step S505, the first wiping controller 125A performs the wiping process step PR23A involving exercising control such that each nozzle surface 23 is wiped with the wiper 71A at the wiping position PlA as illustrated in FIG. 18. In step S505, the first wiping controller 125A controls the head conveyor 51 such that the ink heads 22A move to the wiping position PlA similarly to the wiping process step PR23A (see step S305 of FIG. 20) performed by the second wiping controller 135A illustrated in FIG. 15. Unlike the wiping process step PR23A (see step S305 of FIG. 20) performed by the second wiping controller 135A, the wiping process step PR23A performed by the first wiping controller 125A involves using the wiper 71A having the cleaning fluid 85 applied thereto.

In the second example embodiment, the second cleaning executor 130A illustrated in FIG. 15 is configured or programmed to execute the first normal cleaning process PR33 after execution of the first thorough cleaning process PR31 as illustrated in FIG. 22. Specifically, in step S507 of FIG. 22, the suction controller 131A illustrated in FIG. 15 exercises control for the sucking process step PR21A similarly to step S301 of FIG. 20. In step S509 of FIG. 22, the second removal controller 133A illustrated in FIG. 15 exercises control for the removing process step PR22A similarly to step S303 of FIG. 20. In step S511 of FIG. 22, the second wiping controller 135A illustrated in FIG. 15 exercises control for the wiping process step PR23A similarly to step S305 of FIG. 20.

The second thorough cleaning process PR32 will now be described. The second thorough cleaning process PR32 first involves performing step S601 of FIG. 23. In step S601, the application controller 123A illustrated in FIG. 15 performs the applying process step PR24A. The application controller 123A exercises control such that the cleaning fluid 85 is applied to the wiper 71A at the applying position P3A as illustrated in FIG. 19. The control exercised for the applying process step PR24A in step S601 is similar to the control exercised for the applying process step PR24A in step S503 of FIG. 22.

In step S603 of FIG. 23, the first wiping controller 125A illustrated in FIG. 15 performs the wiping process step PR23A. After the control for the applying process step PR24A has been exercised by the application controller 123A, the first wiping controller 125A exercises control such that each nozzle surface 23 is wiped with the wiper 71A at the wiping position PlA as illustrated in FIG. 18. The control exercised for the wiping process step PR23A in step S603 is similar to the control exercised for the wiping process step PR23A in step S505 of FIG. 22.

In step S605 of FIG. 23, the first removal controller 121A illustrated in FIG. 15 performs the removing process step PR22A. After the control for the wiping process step PR23A has been exercised by the first wiping controller 125A, the first removal controller 121A exercises control such that the wiper 71A comes into contact with the remover 72A at the removing position P2A as illustrated in FIG. 17. The control exercised for the removing process step PR22A in step S605 is similar to the control exercised for the removing process step PR22A in step S501 of FIG. 22.

In the second example embodiment, the second cleaning executor 130A illustrated in FIG. 15 is configured or programmed to execute the second normal cleaning process PR34 after execution of the second thorough cleaning process PR32 as illustrated in FIG. 23. Specifically, in step S607 of FIG. 23, the suction controller 131A illustrated in FIG. 15 exercises control for the sucking process step PR21A similarly to step S401 of FIG. 21. In step S609 of FIG. 23, the second wiping controller 135A exercises control for the wiping process step PR23A similarly to step S403 of FIG. 21. In step S611 of FIG. 23, the second removal controller 133A illustrated in FIG. 15 exercises control for the removing process step PR22A similarly to step S405 of FIG. 21.

In the second example embodiment, the second thorough cleaning process PR32 does not involve performing the removing process step PR22A immediately before the applying process step PR24A in step S601 unlike the first thorough cleaning process PR31. The second normal cleaning process PR34, which follows the second thorough cleaning process PR32, however, involves performing the removing process step PR22A of step S611 before ending the procedure of the cleaning process PR3. Accordingly, the removing process step PR22A has already been performed when the second thorough cleaning process PR32 starts again. Specifically, when the second thorough cleaning process PR32 starts again, the wiper 71A has already undergone the removing process step PR22A and has an attachment (such as ink) removed therefrom successfully. The second thorough cleaning process PR32 thus starts from the applying process step PR24A instead of the removing process step PR22A.

In the second example embodiment, the second thorough cleaning process PR32 illustrated in FIG. 23 involves causing the applier 73A to apply the cleaning fluid 85 to the wiper 71A. Because the nozzle surfaces 23 of the ink heads 22A are wiped with the wiper 71A having the cleaning fluid 85 applied thereto, the cleaning fluid 85 applied to the wiper 71A sticks to, for example, viscous ink adhering to the nozzle surface(s) 23. This facilitates removing the viscous ink from the nozzle surface(s) 23 with the cleaning fluid 85. The second thorough cleaning process PR32 according to the second example embodiment is thus able to successfully remove the viscous ink adhering to the nozzle surface(s) 23 because the cleaning fluid 85 applied to the wiper 71A sticks to the viscous ink. Accordingly, the second thorough cleaning process PR32 according to the second example embodiment achieves effects similar to those achieved by the thorough cleaning process PR11 (see FIG. 13) according to the first example embodiment.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printer comprising:

an ink head including a nozzle surface provided with a nozzle to discharge ink;

a wiper to wipe the nozzle surface at a first position;

a remover to remove an attachment adhering to the wiper upon contacting the wiper at a second position;

an applier to apply a cleaning fluid to the wiper at a third position;

a mover to move the wiper and the ink head relative to each other such that the wiper and the ink head are located at the first position, move the wiper and the remover relative to each other such that the wiper and the remover are located at the second position, and move the wiper and the applier relative to each other such that the wiper and the applier are located at the third position; and a controller configured or programmed to include:

a first cleaning executor configured or programmed to execute a first cleaning process and to include:

a first prior removal controller configured or programmed to exercise control such that the wiper comes into contact with the remover at the second position;

an application controller configured or programmed to exercise control such that the applier applies the cleaning fluid to the wiper at the third position after the control has been exercised by the first prior removal controller; and a first wiping controller configured or programmed to exercise control such that the nozzle surface is wiped with the wiper at the first position after the control has been exercised by the application controller.

2. The printer according to claim 1, wherein the first cleaning executor includes a first subsequent removal controller configured or programmed to exercise control such that the wiper comes into contact with the remover at the second position after the control has been exercised by the first wiping controller.

3. The printer according to claim 1, further comprising:

a cap attachable to the ink head such that the nozzle is covered with the cap;

a capper to attach and detach the cap to and from the ink head; and a suction pump connected to the cap; wherein the controller is configured or programmed to further include a second cleaning executor configured or programmed to execute a second cleaning process; and the second cleaning executor is configured or programmed to include:

a suction controller configured or programmed to exercise control such that the cap is attached to the ink head and the suction pump is activated;

a second prior removal controller configured or programmed to exercise control such that the wiper comes into contact with the remover at the second position after the control has been exercised by the suction controller;

a second wiping controller configured or programmed to exercise control such that the nozzle surface is wiped with the wiper at the first position after the control has been exercised by the second prior removal controller; and a second subsequent removal controller configured or programmed to exercise control such that the wiper comes into contact with the remover at the second position after the control has been exercised by the second wiping controller.

4. The printer according to claim 3, wherein the second wiping controller is configured or programmed to wipe the nozzle surface with the wiper having no cleaning fluid applied thereto.

5. The printer according to claim 3, wherein the second cleaning executor is configured or programmed to execute the second cleaning process after end of printing.

6. The printer according to claim 3, wherein the second cleaning executor is configured or programmed to execute the second cleaning process after the first cleaning process has been executed by the first cleaning executor.

7. The printer according to claim 1, wherein the first cleaning executor is configured or programmed to execute the first cleaning process when a cumulative printing time that has elapsed since previous execution of the first cleaning process is equal to or longer than a predetermined reference time.

8. The printer according to claim 1, wherein the first position, the second position, and the third position are in alignment with each other in a predetermined moving direction; and the mover is operable to move the wiper in the moving direction.

9. The printer according to claim 8, wherein the second position, the third position, and the first position are located in this order in the moving direction.

10. The printer according to claim 8, wherein the mover includes:

a slide rail extending in the moving direction;

a wiper carriage which is in slidable engagement with the slide rail and on which the wiper is mounted; and a slide motor connected to the wiper carriage to move the wiper carriage in the moving direction.

11. The printer according to claim 1, wherein the applier includes:

a container to store the cleaning fluid;

a supply passage including a first end and a second end, the first end being connected to the container;

an on-off valve at a location along the supply passage, the on-off valve being openable and closable; and an applying nozzle connected to the second end of the supply passage to discharge the cleaning fluid onto the wiper.

12. A printer comprising:

an ink head including a nozzle surface provided with a nozzle to discharge ink;

a wiper to wipe the nozzle surface at a first position;

a remover to remove an attachment adhering to the wiper upon contacting the wiper at a second position;

an applier to apply a cleaning fluid to the wiper at a third position;

a mover to move the wiper and the ink head relative to each other such that the wiper and the ink head are located at the first position, move the wiper and the remover relative to each other such that the wiper and the remover are located at the second position, and move the wiper and the applier relative to each other such that the wiper and the applier are located at the third position; and a controller configured or programmed to include:

a first cleaning executor configured or programmed to execute a first cleaning process and include:

an application controller configured or programmed to exercise control such that the applier applies the cleaning fluid to the wiper at the third position;

a first wiping controller configured or programmed to exercise control such that the nozzle surface is wiped with the wiper at the first position after the control has been exercised by the application controller; and a first removal controller configured or programmed to exercise control such that the wiper comes into contact with the remover at the second position after the control has been exercised by the first wiping controller.

13. The printer according to claim 12, further comprising:

a cap attachable to the ink head such that the nozzle is covered with the cap;

a capper to attach and detach the cap to and from the ink head; and a suction pump connected to the cap; wherein the controller is configured or programmed to further include a second cleaning executor configured or programmed to execute a second cleaning process; and the second cleaning executor is configured or programmed to include:

a suction controller configured or programmed to exercise control such that the cap is attached to the ink head and the suction pump is activated;

a second wiping controller configured or programmed to exercise control such that the nozzle surface is wiped with the wiper at the first position after the control has been exercised by the suction controller; and a second removal controller configured or programmed to exercise control such that the wiper comes into contact with the remover at the second position after the control has been exercised by the second wiping controller.

14. The printer according to claim 13, wherein the second wiping controller is configured or programmed to wipe the nozzle surface with the wiper having no cleaning fluid applied thereto.

15. The printer according to claim 13, wherein the second cleaning executor is configured or programmed to execute the second cleaning process after printing has been completed.

16. The printer according to claim 13, wherein the second cleaning executor is configured or programmed to execute the second cleaning process after the first cleaning process has been executed by the first cleaning executor.

* * * * *